United States Patent
Noda et al.

(10) Patent No.: US 12,525,767 B2
(45) Date of Patent: Jan. 13, 2026

(54) SURFACE-EMITTING LASER ELEMENT AND SURFACE-EMITTING LASER ELEMENT MANUFACTURING METHOD

(71) Applicants: KYOTO UNIVERSITY, Kyoto (JP); STANLEY ELECTRIC CO., LTD., Tokyo (JP)

(72) Inventors: Susumu Noda, Kyoto (JP); Takuya Inoue, Kyoto (JP); Tomoaki Koizumi, Tokyo (JP); Kei Emoto, Tokyo (JP)

(73) Assignees: KYOTO UNIVERSITY, Kyoto (JP); STANLEY ELECTRIC CO., LTD., Tokyo (JP)

( * ) Notice: Subject to any disclaimer, the term of this patent is extended or adjusted under 35 U.S.C. 154(b) by 677 days.

(21) Appl. No.: 17/911,643

(22) PCT Filed: Feb. 10, 2021

(86) PCT No.: PCT/JP2021/005100
§ 371 (c)(1),
(2) Date: Sep. 14, 2022

(87) PCT Pub. No.: WO2021/186965
PCT Pub. Date: Sep. 23, 2021

(65) Prior Publication Data
US 2023/0127863 A1    Apr. 27, 2023

(30) Foreign Application Priority Data
Mar. 16, 2020  (JP) ................... 2020-045573

(51) Int. Cl.
*H01S 5/11* (2021.01)
*H01S 5/183* (2006.01)
*H01S 5/343* (2006.01)

(52) U.S. Cl.
CPC ............ *H01S 5/11* (2021.01); *H01S 5/18305* (2013.01); *H01S 5/18316* (2013.01); *H01S 5/34333* (2013.01)

(58) Field of Classification Search
CPC ....................................... H01S 5/11
See application file for complete search history.

(56) References Cited

U.S. PATENT DOCUMENTS

| | | | |
|---|---|---|---|
| 7,656,925 B2 | 2/2010 | Otsuka et al. |
| 8,711,895 B2 | 4/2014 | Noda et al. |

(Continued)

FOREIGN PATENT DOCUMENTS

| | | |
|---|---|---|
| CN | 108701965 A | 10/2018 |
| EP | 3840139 A1 | 6/2021 |

(Continued)

OTHER PUBLICATIONS

International Search Report (ISR) (and English translation thereof) dated Apr. 27, 2021, issued in International Application No. PCT/JP2021/005100.

(Continued)

*Primary Examiner* — James A Menefee
(74) *Attorney, Agent, or Firm* — Holtz, Holtz & Volek PC

(57) ABSTRACT

A surface-emitting laser element includes: a first guide layer including a photonic crystal layer that is formed on a c plane of a group-3 nitride semiconductor and includes air holes arranged with two-dimensional periodicity in a plane parallel to the photonic crystal layer, and an embedding layer that is formed on the photonic crystal layer and closes the air holes; an active layer formed on the first guide layer; and a second guide layer formed on the active layer, wherein an air hole set including at least a main air hole and a sub-air hole smaller in size than the main air hole is arranged at each square lattice point in the plane parallel to the photonic (Continued)

crystal layer, and wherein the main air hole has a regular-hexagonal prism shape, a long-hexagonal prism shape, or an elliptic cylindrical shape with a major axis parallel to a <11-20> axis.

11 Claims, 23 Drawing Sheets

(56) References Cited

U.S. PATENT DOCUMENTS

| | | | |
|---|---|---|---|
| 8,855,158 | B2 | 10/2014 | Nagatomo et al. |
| 8,861,564 | B2 | 10/2014 | Nagatomo et al. |
| 10,461,502 | B2 | 10/2019 | Noda et al. |
| 11,539,187 | B2 * | 12/2022 | Noda ............... H01S 5/11 |
| 2009/0135869 | A1 | 5/2009 | Noda et al. |
| 2012/0002692 | A1 | 1/2012 | Noda et al. |
| 2018/0026419 | A1 * | 1/2018 | Hirose ........ H01S 5/18394 353/22 |
| 2019/0067907 | A1 | 2/2019 | Noda et al. |
| 2020/0251887 | A1 | 8/2020 | Noda et al. |
| 2021/0013700 | A1 | 1/2021 | Noda et al. |
| 2021/0184430 | A1 | 6/2021 | Noda et al. |
| 2021/0184431 | A1 | 6/2021 | Noda et al. |
| 2021/0226420 | A1 | 7/2021 | Aoki et al. |
| 2021/0328406 | A1 | 10/2021 | Noda et al. |

FOREIGN PATENT DOCUMENTS

| | | |
|---|---|---|
| EP | 3843225 A1 | 6/2021 |
| JP | 2007067182 A | 3/2007 |
| JP | 2007180120 A | 7/2007 |
| JP | 2008243962 A | 10/2008 |
| JP | 4294023 B2 | 4/2009 |
| JP | 2011119349 A | 6/2011 |
| JP | 2012227425 A | 11/2012 |
| JP | 2019114663 A | 7/2019 |
| JP | 2021097114 A | 6/2021 |
| JP | 2021097115 A | 6/2021 |
| WO | 2017150387 A1 | 9/2017 |
| WO | 2018155710 A1 | 8/2018 |
| WO | 2019124312 A1 | 6/2019 |
| WO | 2019235535 A1 | 12/2019 |
| WO | 2020050130 A1 | 3/2020 |

OTHER PUBLICATIONS

Written Opinion dated Apr. 27, 2021, issued in International Application No. PCT/JP2021/005100.
Extended European Search Report (EESR) dated Jul. 21, 2023, issued in counterpart European Application No. 21772301.4.
Yoshida, et al., "Elliptical Double-Hole Photonic-Crystal Surface-Emitting Lasers", 2017 Conference on Lasers and Electro-Optics Pacific Rim, Jul. 31, 2017, pp. 1-3.
Chinese Office Action (and an English language translation thereof) dated Dec. 23, 2024, issued in counterpart Chinese Application No. 202180021422.5.
Taiwanese Office Action (and an English language translation thereof) dated Oct. 23, 2024, issued in counterpart Taiwanese Application No. 110106415.
Chinese Office Action (and an English language translation thereof) dated Aug. 15, 2024, issued in counterpart Chinese Application No. 202180021422.5.

* cited by examiner

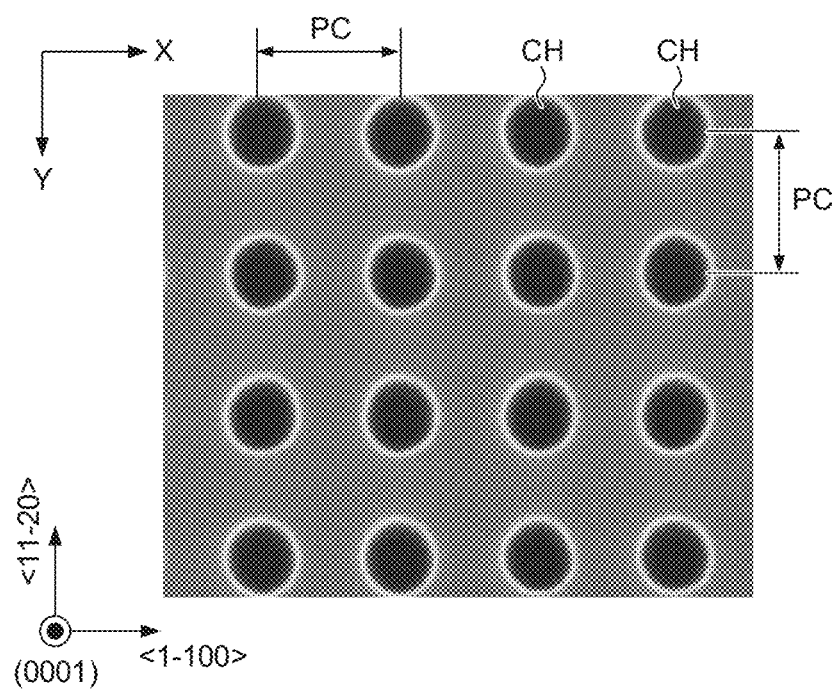

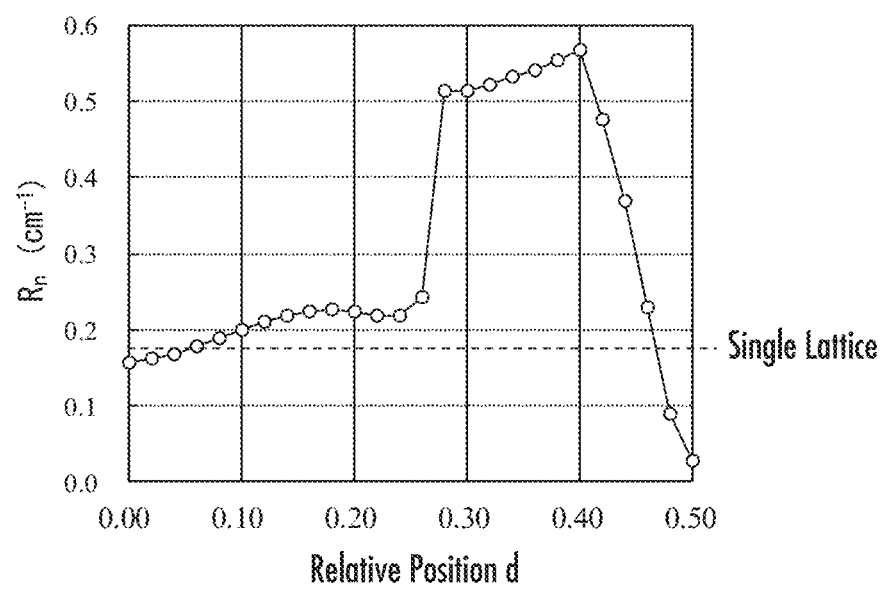

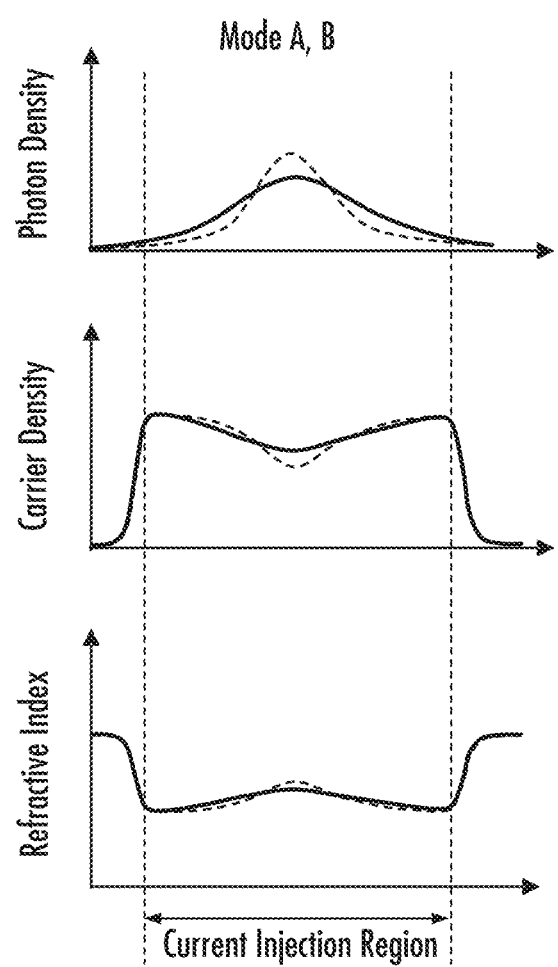

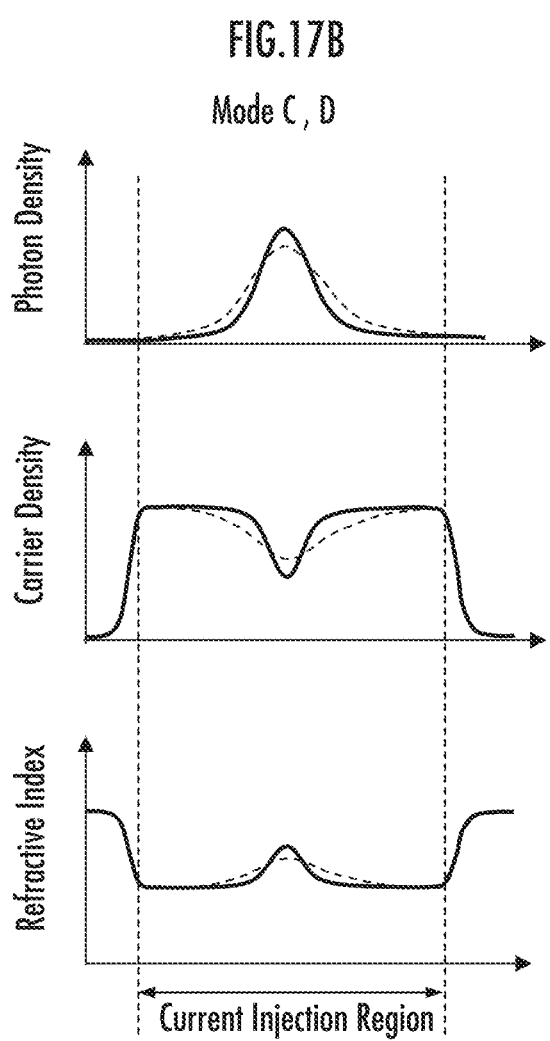

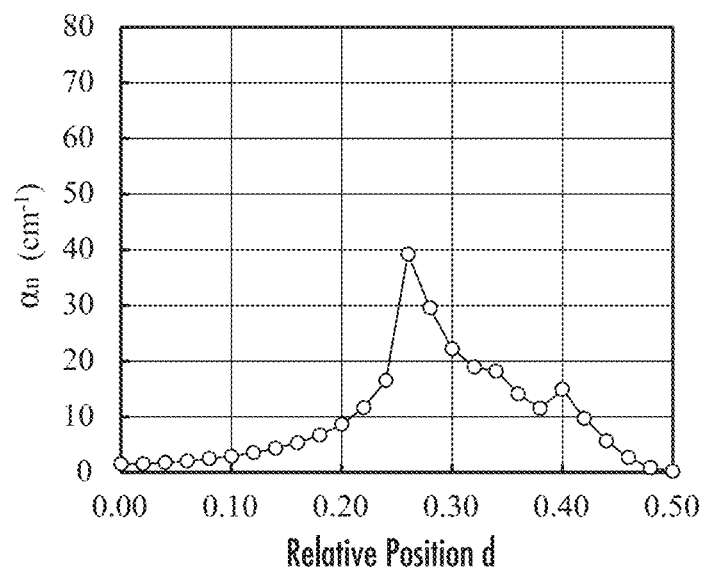
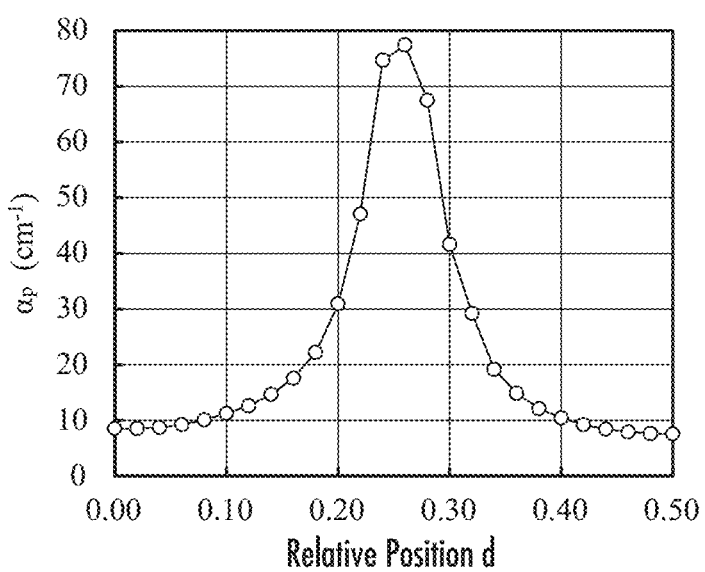

SURFACE-EMITTING LASER ELEMENT AND SURFACE-EMITTING LASER ELEMENT MANUFACTURING METHOD

TECHNICAL FIELD

The present invention relates to a surface-emitting laser element and a manufacturing method for the same, and particularly relates to a photonic-crystal surface-emitting laser element and a manufacturing method for the same.

BACKGROUND ART

Photonic-crystal surface-emitting lasers using photonic crystals (PCs) have been developed in recent years.

For example, Patent Literature 1 describes a two-dimensional photonic-crystal surface-emitting laser light source including a two-dimensional photonic crystal in which, in a plate-shaped base material, a large number of different-refractive-index region aggregates each composed of a plurality of regions that differ in refractive index from the base material and include at least two regions different in thickness from each other are periodically arranged. According to Patent Literature 1, with such a structure, the symmetry in a plane parallel to the base material is lower than that of a two-dimensional photonic crystal in which cylindrical different-refractive-index regions are periodically arranged, so that a decrease in laser light extraction efficiency due to cancellation of antisymmetric mode caused by interference can be suppressed.

In the case where an embedding layer for embedding the two-dimensional photonic crystal having a large number of air holes periodically arranged in the crystal plane is grown on the two-dimensional photonic crystal, the surface of the embedding layer roughens. This causes quality deterioration of an active layer grown on the embedding layer.

CITATION LIST

Patent Literature

Patent Literature 1: Japanese Patent No. 4294023

SUMMARY OF INVENTION

Technical Problem

As mentioned above, there is a problem in that, in a photonic-crystal surface-emitting laser, the surface of an embedding layer for embedding a two-dimensional photonic crystal layer roughens and consequently the quality of an active layer formed on the embedding layer deteriorates.

The present inventors found out that, in the case where a two-dimensional photonic crystal in which a set of air holes of different sizes is periodically arranged is embedded in an embedding layer, the surface of the embedding layer is rougher than in the case of a two-dimensional photonic crystal composed of air holes of a single size.

In particular, the present inventors found out that, in an embedding layer formation step, mass transport causes air holes to change in shape, and, due to such shape changes, the shape changes of adjacent air holes interfere with each other and as a result the surface of the embedding layer becomes uneven.

In view of the above, the present invention has an object of providing a photonic-crystal surface-emitting laser that includes a two-dimensional photonic crystal (hereafter also referred to as a multiple lattice photonic crystal) in which a plurality of air holes of different sizes are arranged at lattice points and a set of the plurality of air holes is periodically arranged and has significantly improved flatness of the surface of an embedding layer for embedding the multiple lattice photonic crystal, and a manufacturing method for the same.

The present invention also has an object of providing a photonic-crystal surface-emitting laser that has high flatness and crystallinity of an active layer formed on a multiple lattice photonic crystal layer, has high light extraction efficiency, and can oscillate with low threshold current density and high quantum efficiency, and a manufacturing method for the same.

Solution to Problem

A surface-emitting laser element according to one aspect of the present invention is a surface-emitting laser element made of a group-3 (or group-III) nitride semiconductor, the surface-emitting laser element including: a first guide layer including a photonic crystal layer that is formed on a c plane of the group-3 nitride semiconductor and includes air holes arranged with two-dimensional periodicity in a plane parallel to the photonic crystal layer, and an embedding layer that is formed on the photonic crystal layer and closes the air holes; an active layer formed on the first guide layer; and a second guide layer formed on the active layer, wherein an air hole set including at least a main air hole and a sub-air hole smaller in size than the main air hole is arranged at each square lattice point in the plane parallel to the photonic crystal layer, and wherein the main air hole has a regular-hexagonal prism shape, a long-hexagonal prism shape, or an elliptic cylindrical shape with a major axis parallel to a <11-20> axis.

A surface-emitting laser element manufacturing method according to another aspect of the present invention is a manufacturing method for a surface-emitting laser element made of a group-3 nitride semiconductor, the manufacturing method including: a step of forming a guide layer on a c plane of the group-3 nitride semiconductor; a step of forming an etching mask on the guide layer, the etching mask having an opening set including at least a main opening and a sub-opening smaller in size than the main opening at each square lattice point; a step of forming a main hole and a sub-hole by etching the guide layer using the etching mask; a step of forming an embedding layer that closes openings of the main hole and the sub-hole by performing crystal growth including mass transport, to form a multiple lattice photonic crystal layer in which an air hole set including a main air hole and a sub-air hole smaller in size than the main air hole is arranged at each square lattice point; and a step of forming a semiconductor layer including an active layer on the multiple lattice photonic crystal layer, wherein the main air hole has a regular-hexagonal prism shape, a long-hexagonal prism shape, or an elliptic cylindrical shape with a major axis parallel to a <11-20> axis.

BRIEF DESCRIPTION OF DRAWINGS

FIG. 7 is a SEM image illustrating cylindrical holes CH formed in a GaN surface portion in Comparative Example 1.

FIG. 12C is a graph illustrating $R_n$ which is the proportion of resonator loss $\alpha_n$ in the vertical direction to total resonator loss ($\alpha_p+\alpha_n$).

FIG. 17A is a diagram schematically illustrating the refractive index, the carrier density, and the photon density in the current injection region in oscillation operation in band edge modes A and B, where the solid line indicates the case where the photonic band effect is taken into consideration and the dashed line indicates the case where the photonic band effect is not taken into consideration.

FIG. 17B is a diagram schematically illustrating the refractive index, the carrier density, and the photon density in the current injection region in oscillation operation in band edge modes C and D, where the solid line indicates the case where the photonic band effect is taken into consideration and the dashed line indicates the case where the photonic band effect is not taken into consideration.

FIG. 21A is a diagram illustrating resonator loss $\alpha_n$ in the vertical direction to d (the relative position of the sub-air hole to the main air hole).

FIG. 21B is a diagram illustrating resonator loss up in the horizontal direction to relative position d.

DESCRIPTION OF EMBODIMENTS

Figure 1A:
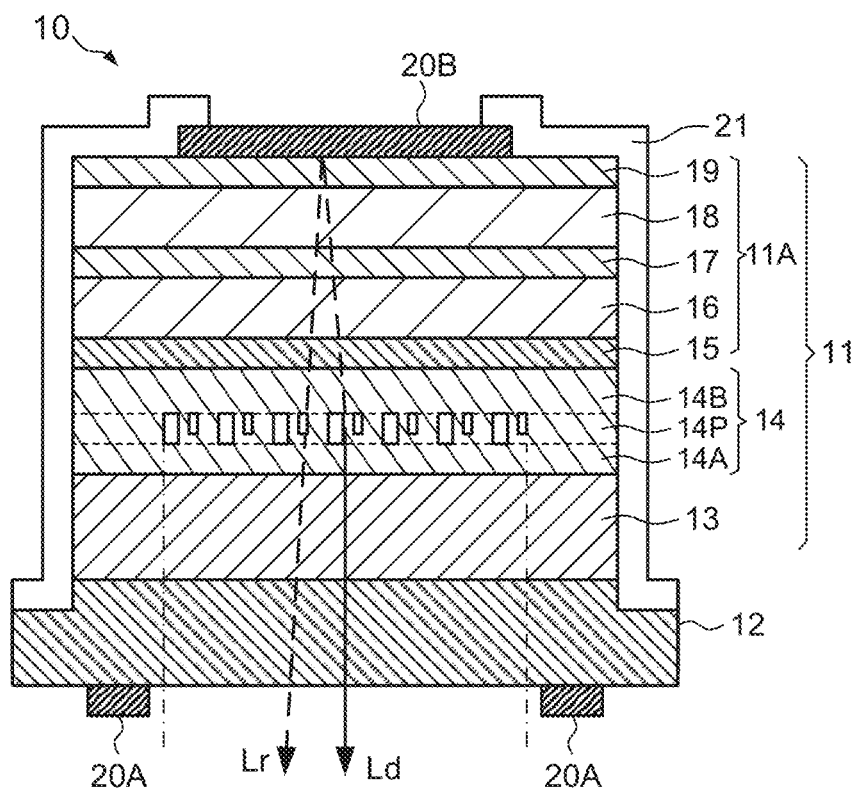
FIG. 1A is a cross-sectional view schematically illustrating an example of the structure of a photonic crystal laser element (PCSEL element) 10.

While preferred embodiments of the present invention will be described below, such embodiments may be modified or combined as appropriate. In the following description and the accompanying drawings, substantially the same or equivalent portions are given the same reference numerals.

[Structure of Photonic-Crystal Surface-Emitting Laser]

A photonic-crystal surface-emitting laser (hereinafter also referred to a PCSEL) is an element that includes a resonator layer in a direction parallel to a semiconductor light-emitting structure layer (n-guide layer, light-emitting layer, and p-guide layer) constituting a light-emitting element, and emits light coherent in a direction orthogonal to the resonator layer.

There is known a distributed Bragg reflector (DBR) laser including a pair of resonator mirrors (Braggs reflectors) sandwiching a semiconductor light-emitting layer. The photonic-crystal surface-emitting laser (PCSEL) is different from the DBR laser in the following point: In the photonic-crystal surface-emitting laser (PCSEL), light waves propagating in a plane parallel to the photonic crystal layer are diffracted by the diffraction effect of the photonic crystal to form a two-dimensional resonant mode, and are diffracted in a direction perpendicular to the parallel plane as well. That is, the light extraction direction is perpendicular to the direction of resonance (in the plane parallel to the PC layer).

FIG. 1A is a cross-sectional view schematically illustrating an example of the structure (first PCSEL structure) of a photonic crystal laser element (PCSEL element) 10. As illustrated in FIG. 1A, a semiconductor structure layer 11 is formed on a substrate 12. The semiconductor structure layer 11 is made of a hexagonal nitride semiconductor. For example, the semiconductor structure layer 11 is made of a GaN-based semiconductor.

In more detail, an n-cladding layer (first cladding layer of a first conductive type) 13, an n-guide layer (first guide layer) 14, an active layer 15, a p-guide layer (second guide layer) 16, an electron blocking layer (EBL) 17, a p cladding layer (second cladding layer of a second conductive type) 18, and a p contact layer 19 are formed on the substrate 12 in this order as the semiconductor structure layer 11. While the following description deals with the case where the first conductive type is n type and the second conductive type opposite to the first conductive type is p type, the first and second conductive types may be p and n types respectively.

The n-guide layer 14 includes a lower guide layer 14A, a photonic crystal layer (air hole layer or PC layer) 14P, and an embedding layer 14B. The embedding layer 14B includes a first the embedding layer 14B1 and a second embedding layer 14B2.

Herein, "n-" and "p-" refer to "n side" and "p side", not necessarily to n type or p type. For example, the n-guide layer refers to a guide layer located on the n side of the active layer, and may be an undoped layer (or i layer).

The n-cladding layer 13 may include a plurality of layers instead of a single layer. In such a case, all of the layers do not need to be n-type layers (n-doped layers), and an undoped layer or layers (i layer(s)) may be included. The same applies to the guide layer 16 and the p cladding layer 18. All the foregoing semiconductor layers do not necessarily need to be provided. The semiconductor structure layer 11 may have any structure as long as the layer includes at least an n-type semiconductor layer, a p-type semiconductor layer, and an active layer (light-emitting layer) sandwiched therebetween.

Although the above describes the detailed specific semiconductor layer structure of the photonic crystal laser element 10, this is merely an example of the element structure. The photonic crystal laser element 10 is not limited as long as it includes the first semiconductor layer (or guide layer) including the photonic crystal layer 14P, the second semiconductor layer (or guide layer), and the active layer (light-emitting layer) sandwiched between these layers and is configured to emit light by current injection to the active layer.

For example, the photonic crystal laser element need not include all of the semiconductor layers described above. The photonic crystal laser element may include various semiconductor layers (for example, hole barrier layer, light confinement layer, current confinement layer, tunnel junction layer, etc.) for improving the element characteristics.

An n electrode (cathode) 20A is formed on the back of the substrate 12. A p electrode (anode) 20B is formed on (the top surface of) the p contact layer 19. The side surfaces of the semiconductor structure layer 11 and the side surfaces of the upper portion of the substrate 12 are coated with an insulating film 21 such as an $SiO_2$ film. The side surfaces of the p electrode 20B and the surface of the p contact layer 19 are coated with an insulating film 21 so that the rim of the top surface of the p electrode 20B will be covered.

Light (direct emission light Ld) directly emitted from the photonic crystal layer 14P and light (reflected emission light Lr) emitted from the photonic crystal layer 14P and reflected by the p electrode 20B are emitted to outside from a light-emitting region 20L on the back of the substrate 12.

Figure 1B:
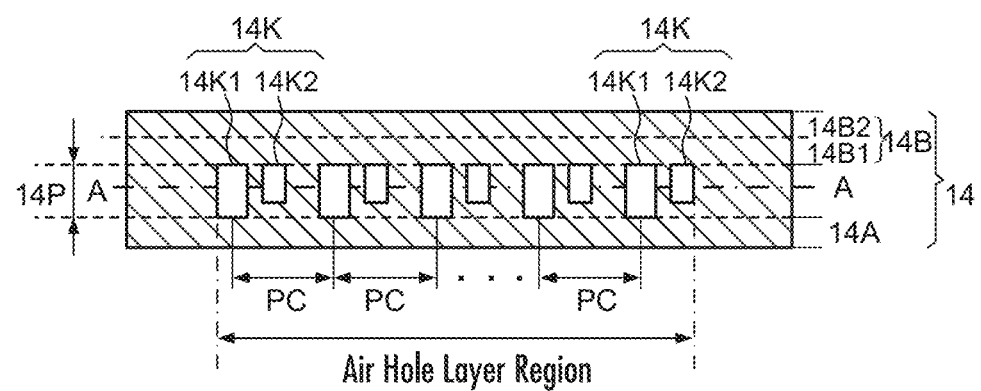
FIG. 1B is an enlarged cross-sectional view schematically illustrating a photonic crystal layer 14P in FIG. 1A and an air hole pair 14K arranged in the photonic crystal layer 14P.

FIG. 1B is an enlarged cross-sectional view schematically illustrating the photonic crystal layer 14P in FIG. 1A and air hole pairs 14K arranged in the photonic crystal layer 14P. The air hole pairs 14K (main air hole 14K1 and sub-air hole 14K2) are formed and embedded inside the n-guide layer 14. The air hole pairs 14K are two-dimensionally arranged in a crystal growth plane (semiconductor layer growth plane), i.e., a plane (section taken along line A-A in the drawing) parallel to the n-guide layer 14 at the respective positions of square lattice points in a square lattice configuration with a period PC, for example.

Figure 2A:
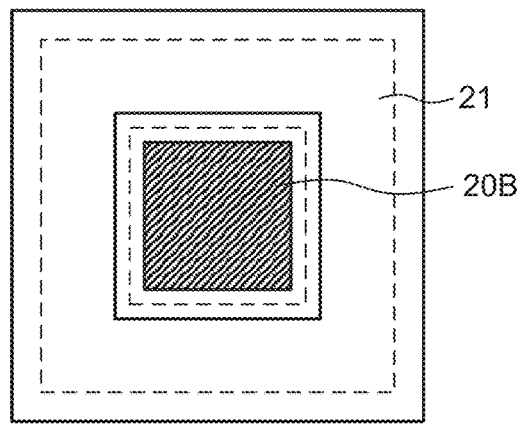
FIG. 2A is a plan view schematically illustrating the top surface of the photonic-crystal laser element (PCSEL element) 10.
Figure 2B:
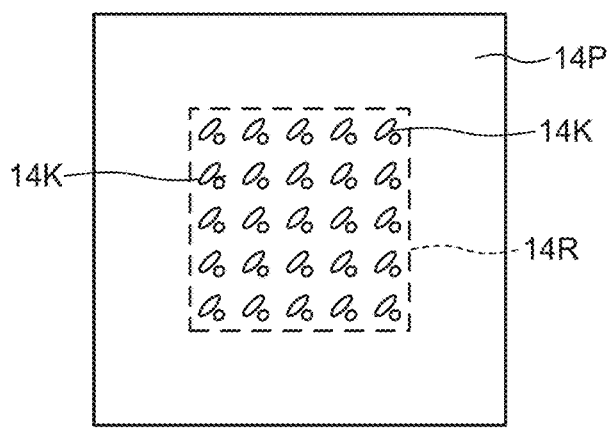
FIG. 2B is a cross-sectional view schematically illustrating a cross section of the photonic crystal layer 14P (section taken along line A-A in FIG. 1B) in a plane parallel to an n-guide layer 14.
Figure 2C:
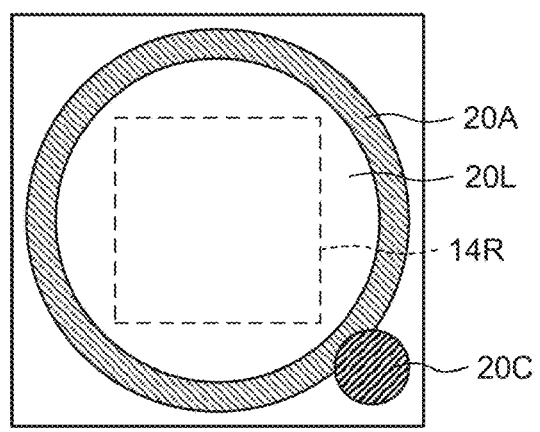
FIG. 2C is a plan view schematically illustrating the bottom surface of the photonic-crystal laser element (PCSEL element) 10.

FIG. 2A is a plan view schematically illustrating the top surface of the photonic-crystal laser element (PCSEL element) 10. FIG. 2B is a cross-sectional view schematically illustrating a cross section along a plane (section taken along line A-A in FIG. 1B) parallel to the n-guide layer 14 of the photonic crystal layer (PC layer) 14P. FIG. 2C is a plan view schematically illustrating the bottom surface of the photonic-crystal laser element (PCSEL element) 10.

As illustrated in FIG. 2B, the air hole pairs 14K in the photonic crystal layer 14P are periodically arranged within, for example, a rectangular air hole formation region 14R. As illustrated in FIG. 2C, the n electrode (cathode) 20A is formed as an annular electrode outside the air hole formation region 14R so as not to overlap the air hole formation region 14R when seen in the direction perpendicular to the photonic crystal layer 14P. The region inside the n electrode 20A is the light-emitting region 20L. The photonic-crystal laser element (PCSEL element) 10 includes a bonding pad 20C electrically connected to the n electrode 20A and used to connect a feeding wire from outside.

Example 1

1. Production Steps of Photonic-Crystal Laser (PCSEL) 10

The production steps of the PCSEL element 10 will be described in detail below. The semiconductor structure layer 11 was grown on the growth substrate 12 by normal pressure (atmospheric pressure) growth using an MOVPE (metalorganic vapor phase epitaxy) method as the crystal growth method. In the steps described below, Sn refers to step n.

The layer thicknesses, carrier concentrations, group-3 (group-III) and group-5 (group-V) materials, temperatures, etc. described below are only examples unless otherwise specified.

[S1: Substrate Preparation Step]

A "+c"-plane GaN single crystal with (0001) plane where Ga atoms are arranged at the outermost surface as its main surface was prepared. The main surface may be a just plane. The substrate may be offset up to about 1° in an m-axis direction. For example, a substrate offset up to about 1° in the m-axis direction enables mirror surface growth over a wide range of growth conditions.

The substrate surface (backside) where the light-emitting region 20L is provided opposite the main surface is "−c"-plane, which is (000-1) plane where N atoms are arranged on the outermost surface. The −c-plane is resistant to oxidation etc., and thus suitable as a light extraction surface.

In this example, an n-type GaN single crystal was used as the GaN substrate 12. The n-type GaN substrate 12n has a function as a contact layer with an electrode.

[S2: n-Cladding Layer Formation Step]

As the n-cladding layer 13, a 2-μm-thick n-type $Al_{0.04}Ga_{0.96}N$ layer having an Al composition of 4% was grown on the +c-plane GaN substrate 12. The AlGaN layer was grown by supplying trimethylgallium (TMG) and trimethylaluminum (TMA) as group-3 atom sources to the GaN substrate heated to 1100° C.

For carrier doping, silane ($SiH_4$) was supplied simultaneously with the foregoing materials (Si doping). The carrier concentration at room temperature was approximately $4\times10^{17}$ cm$^{-3}$.

[S3a: Lower Guide Layer and Air-Hole Preparation Layer Formation Step]

Subsequently, TMG was supplied to grow a 250 nm-thick n-type GaN layer as a preparation layer of the n-guide layer 14. As with the AlGaN layer, silane ($SiH_4$) was simultaneously supplied for carrier doping. The carrier concentration was approximately $4\times10^{17}$ cm$^{-3}$.

The resulting growth layer is a preparation layer for forming the layer composed of the lower guide layer 14A and the photonic crystal layer 14P.

For the sake of simple description and easy understanding, the substrate 12 where such a growth layer is formed (growth layer-containing substrate) may hereinafter be referred to simply as a substrate.

[S3b: Hole and Air Hole Formation Step]

After the formation of the preparation layer, the substrate was taken out of the chamber of the MOVPE apparatus, and fine holes were formed on the surface of the growth layer. More specifically, after the surface of the substrate was cleaned, a silicon nitride film ($Si_xN_y$) was deposited on the clean surface using plasma CVD. An electron beam drawing resist was applied thereon by spin coating, and a two-dimensional periodic structure was patterned in an electron beam (EB) drawing apparatus.

Figure 3:
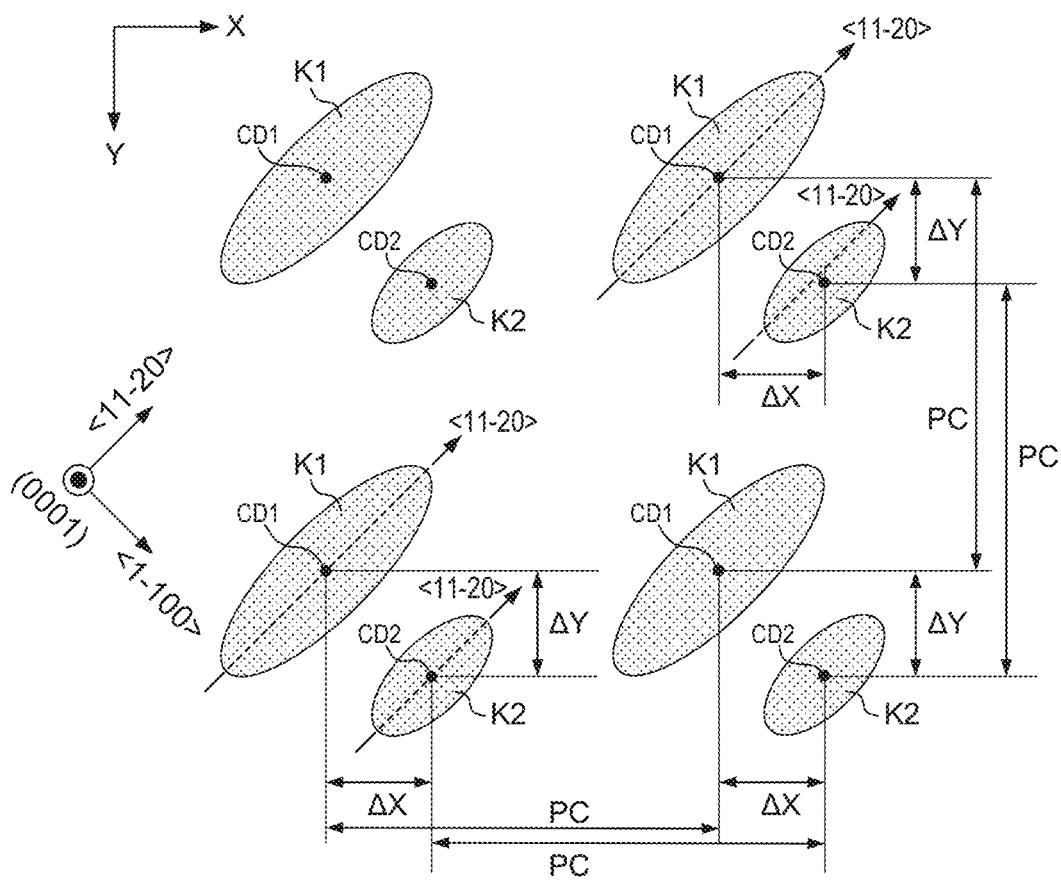
FIG. 3 is a top view schematically illustrating a resist in which opening pairs each made up of an elliptic main opening K1 and sub-opening K2 are two-dimensionally arranged in a plane in a square lattice configuration.

As illustrated in FIG. 3, patterning was performed with each opening pair of a main opening K1 and a sub-opening K2 smaller than the main opening K1 in an elliptic (oval) shape being two-dimensionally arranged in the plane of the resist in a square lattice configuration with a period PC=164 nm. The openings are hatched for clarity in illustration.

In more detail, the main openings K1 were arranged with their center-of-gravities CD1 being in a square lattice configuration with a period PC=164 nm in two directions (x direction and y direction) orthogonal to each other. Likewise, the sub-openings K2 were arranged with their center-of-gravities CD2 being in a square lattice configuration with a period PC=164 nm in x direction and y direction.

The major axes of the main opening K1 and the sub-opening K2 were parallel to <11-20> direction of the crystal orientation, and the minor axes of the main opening K1 and the sub-opening K2 were parallel to <1-100> direction.

The center-of-gravity CD2 of the sub-opening K2 was separate from the center-of-gravity CD1 of the main opening K1 by Δx and Δy. Here, Δx=Δy. That is, the center-of-gravity CD2 of the sub-opening K2 was separate from the center-of-gravity CD1 of the main opening K1 in <1-100> direction. Specifically, the distance Δx between the center-of-gravities CD1 and CD2 in x direction and the distance Δy between the center-of-gravities CD1 and CD2 in y direction were 65.6 nm (=PC×0.4).

The main opening K1 had a major axis diameter of 125 nm and a minor axis diameter of 50 nm, where the ratio of the major axis diameter to the minor axis diameter (major axis diameter/minor axis diameter)=2.50. The sub-opening K2 had a major axis diameter of 57.5 nm and a minor axis diameter of 50 nm, where the major axis diameter/minor axis diameter=1.15.

After the patterned resist was developed, the $Si_xN_y$ film was selectively dry etched in an ICP-RIE (inductive coupled plasma reactive ion etching) apparatus. The main openings K1 and the sub-openings K2 arranged in a square lattice configuration with a period of 164 nm were thus formed through the $Si_xN_y$ film.

The period (air hole pitch) PC was calculated as PC=λ/n=164 nm, where the oscillation wavelength (λ) was 410 nm and the refractive index (n) of GaN was 2.5.

Subsequently, the resist was removed, and holes were formed in the GaN surface portion using the patterned $Si_xN_y$ film as a hard mask. Holes 14H1 and 14H2 that are elliptic cylindrical air holes dug perpendicularly to the GaN surface were formed by dry-etching GaN in the depth direction in the ICP-RIE apparatus using chlorine-based gas and argon gas. To make a distinction from the air holes in the photonic crystal layer 14P, the holes formed in the GaN surface portion by the etching in this step is hereafter simply referred to as "holes".

[S3c: Cleaning Step]

Figure 4:
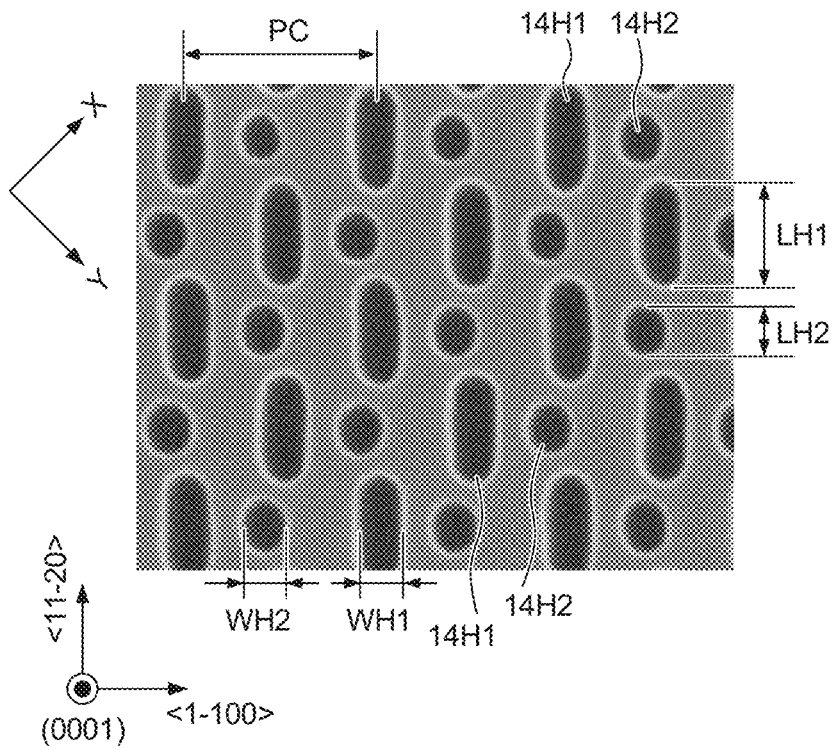
FIG. 4 is a SEM image of a GaN surface on which holes 14H1 and 14H2 are formed.

The substrate in which the holes 14H1 and 14H2 were formed was subjected to degreasing, and then the $Si_xN_y$ film was removed using buffered hydrofluoric acid (HF). FIG. 4 illustrates a SEM (scanning electron microscope) image of the GaN surface in this stage.

As illustrated in the surface SEM image in FIG. 4, a plurality of hole pairs 14H (main hole 14H1 and sub-hole 14H2) arranged in a square lattice configuration, i.e., two-dimensionally arranged at square lattice points, with a period PC of 164 nm were formed. The holes 14H1 and 14H2 were approximately elliptic cylindrical holes open to the top surface (GaN surface).

In more detail, the opening of the main hole 14H1 at the GaN surface had a major axis diameter LH1 of 124 nm and a minor axis diameter WH1 of 50 nm (RH1=major axis diameter/minor axis diameter=2.49), and the opening of the sub-hole 14H2 had a major axis diameter LH2 of 57.1 nm and a minor axis diameter WH1 of 50.0 nm (RH2=major axis diameter/minor axis diameter=1.14) in the GaN surface.

Here, the distance between the center-of-gravity CD1 of the main hole 14H1 and the center-of-gravity CD2 of the sub-hole 14H2 in each of x direction and y direction was 65.3 nm (=0.4×PC). The major axis of each of the main hole 14H1 and the sub-hole 14H2 was parallel to <11-20> axis (i.e., a axis).

As illustrated in FIG. 4, x direction and y direction are respectively directions inclined 45° with respect to the major axis direction (<11-20> direction) and the minor axis direction (<1-100> direction) of each of the opening of the main hole 14H1 and the opening of the sub-hole 14H2. Herein, x-y coordinates are also referred to as "air hole coordinates".

[S3d: Embedding Layer Formation Step]

The substrate was put into the reactor of the MOVPE apparatus again. Ammonia (NH$_3$) was supplied, the temperature of the substrate was increased to 950° C. (first embedding temperature), and then trimethylgallium (TMG) and NH$_3$ were supplied to close the openings of the main hole 14H1 and the sub-hole 14H2 to form a first the embedding layer 14B1.

First, in a process (temperature increasing process) of reaching a first temperature region (800° C. or more and 1100° C. or less), Ga atoms on the surface of the growth substrate caused mass transport under the supplied NH$_3$ atmosphere, and an eave portion having {1-101} plane and {1-100} plane was formed so as to close the openings of the holes formed in the n-cladding layer.

Next, the TMG supplied after the first temperature region was reached caused the foregoing eave portion to grow in the hole center direction, and, as a result of coalescence, the main hole 14H1 and the sub-hole 14H2 were closed an embedded. The first embedding layer 14B1 was thus formed.

Then, after the main hole 14H1 and the sub-hole 14H2 were closed, the second embedding layer 14B2 of 50 nm in thickness was grown. The growth of the second embedding layer 14B2 was carried out by decreasing the substrate temperature to 820° C. (second embedding temperature) and then supplying triethylgallium (TEG) and trimethylindium (TMI) as group-3 atom sources and supplying NH$_3$ as a nitrogen source. The second embedding temperature is lower than the first embedding temperature, and is 700° C. or more and less than 900° C.

The In composition of the second embedding layer 14B2 in this embodiment was 2% (i.e., Ga$_{0.98}$In$_{0.02}$N layer). The second embedding layer 14B2 functions as a light distribution adjusting layer for adjusting the bonding efficiency (optical field) between light and the photonic crystal layer 14P.

As a result of the embedding step described above, the photonic crystal layer 14P having a dual lattice structure in which the air hole pair 14K made up of the main air hole 14K1 and the sub-air hole 14K2 was arranged at each square lattice point was formed.

[S4: Light-Emitting Layer Formation Step]

Next, a multiple quantum well (MQW) layer was grown as the active layer 15 which is the light-emitting layer. The MQW layer included GaN barrier layers and InGaN well layers. The barrier layers were grown by decreasing the temperature of the substrate to 820° C. and then supplying triethylgallium (TEG) as a group-3 atom source and NH$_3$ as a nitrogen source. The well layers were grown at the same temperature as with the barrier layers, by supplying TEG and trimethylindium (TMI) as group-3 atom sources and NH$_3$ as a nitrogen source. The center wavelength of PL (photoluminescence) emission from the active layer in this example was 412 nm.

[S5: p-Guide Layer Formation Step]

After the growth of the active layer, the temperature of the substrate was increased to 1050° C., and a 120-nm-thick GaN layer was grown as the p-guide layer 16. The p-guide layer 16 was grown by supplying TMG and NH$_3$ without doping with a dopant.

[S6: Electron Blocking Layer Formation Step]

After the growth of the p-guide layer 16, the electron blocking layer (EBL) 17 was grown while maintaining the substrate temperature at 1050° C. The EBL 17 was grown by supplying TMG and TMA as group-3 atom sources and NH$_3$ as a nitrogen source. In addition, Cp$_2$Mg was supplied as a p-dopant. The EBL 17 having an Al composition of 18% and a thickness of 15 nm was thus formed.

[S7: p Cladding Layer Formation Step]

After the growth of the electron blocking layer (EBL) 17, the p cladding layer 18 was grown while maintaining the substrate temperature at 1050° C. The p cladding layer 18 was grown by supplying TMG and TMA as group-3 atom sources and NH$_3$ as a nitrogen source. In addition, Cp$_2$Mg was supplied as a p-dopant. The p cladding layer 18 having an Al composition of 6% and a thickness of 600 nm was thus formed. The p cladding layer (p-AlGaN) 18 had a carrier concentration of $2 \times 10^{17}$ cm$^{-3}$ when activated in the N$_2$ atmosphere at 850° C. for 10 minutes after the growth.

[S8: p Contact Layer Formation Step]

After the growth of the p cladding layer 18, the p contact layer 19 was grown while maintaining the substrate temperature at 1050° C. The p contact layer 19 was grown by supplying TMG as a group-3 atom source and NH$_3$ as a nitrogen source. In addition, Cp$_2$Mg was supplied as a dopant.

[S9: Electrode Formation Step]

The surface of the p contact layer 19 of the growth layer-containing substrate on which the formation of the epitaxial growth layers was completed was pasted to a support substrate, and the substrate 12 was thinned to a predetermined thickness by a polishing apparatus.

A mask was then formed on the p contact layer 19 side of the substrate to cover the substrate except element isolation grooves, and etching was performed until the n-cladding layer 13 or the substrate 12 was exposed. After this, the mask was removed and the support substrate was detached to form the element isolation grooves.

[S10: Electrode Formation Step]

(Formation of Anode Electrode)

To form the p electrode 20B, a palladium (Pd) film and a gold (Au) film were deposited in this order on the surface of the epitaxial growth substrate 12 by electron beam deposition. The p electrode 20B was formed by patterning the deposited electrode metal films into 200×200 μm$^2$ by photolithography.

(Formation of Cathode Electrode)

Next, the n electrode 20A was formed by depositing Ti and Au in this order on the back surface of the substrate 12 by electron beam deposition.

[S11: Protective Film Formation Step]

The bottom surface of the electrode-formed substrate was pasted to a support substrate, and a mask for covering the anode electrode was formed. An SiO$_2$ film serving as a protective film was then formed on the top and side surfaces of the element by sputtering.

[S12: Dicing Step]

Finally, laser scribing was performed along the center lines of the element isolation grooves, thus obtaining a diced PCSEL element (hereafter referred to as a PCSEL element or simply as a PCSEL) 10 was obtained.

2. Main Air Hole and Sub-Air Hole

Figure 5:
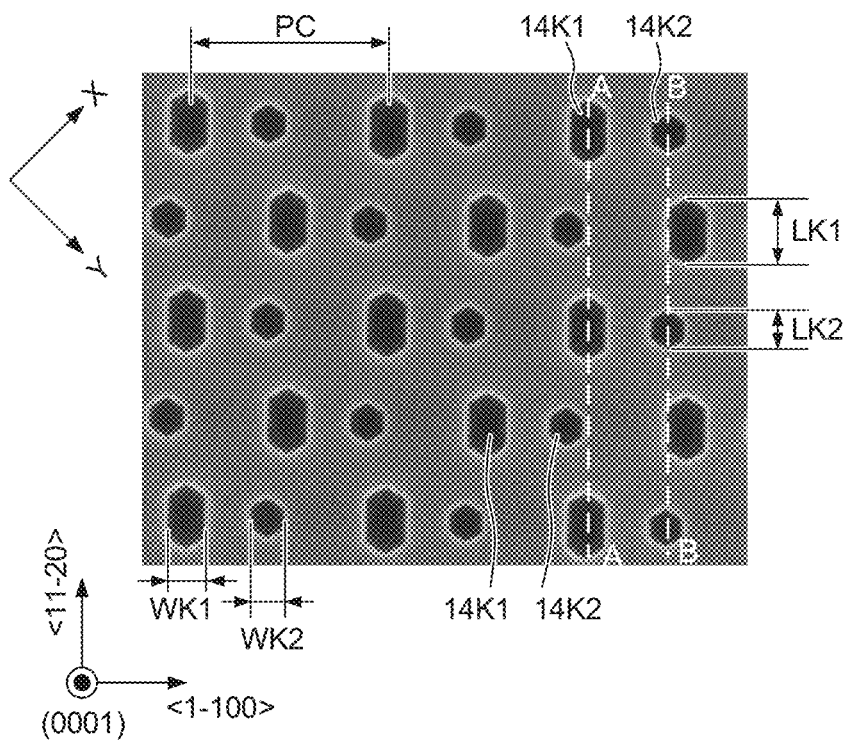
FIG. 5 is a SEM image of a guide layer top surface illustrating the air hole shapes of a main air hole 14K1 and a sub-air hole 14K2 in this embodiment.

To determine the shapes of the embedded air holes in this example, the laminate structure was processed from the surface by a focused ion beam (FIB) until the air holes in the air hole layer were exposed, and then SEM observation was performed. FIG. 5 is a top surface SEM image illustrating the air hole shapes of the main air hole 14K1 and the sub-air hole 14K2 smaller in size than the main air hole 14K1. The sub-air hole 14K2 is smaller than the main air hole 14K1 in air hole diameter and/or depth.

Figure 6A:
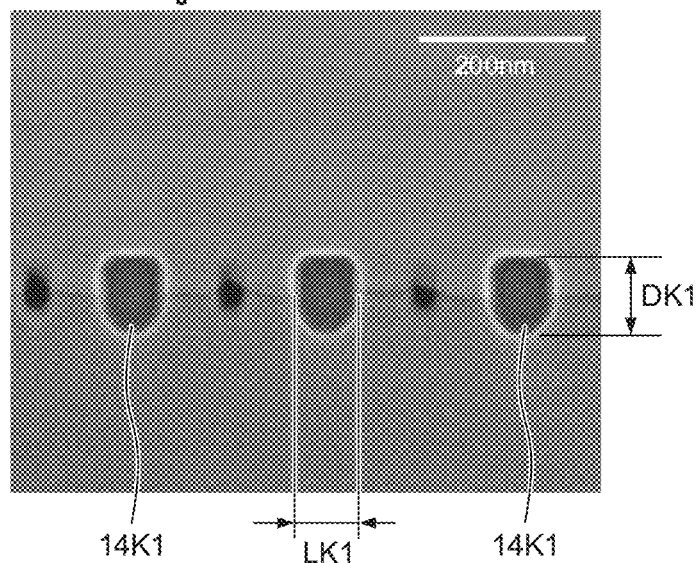
FIG. 6A is a SEM image illustrating a cross section taken along line A-A in FIG. 5.
Figure 6B:
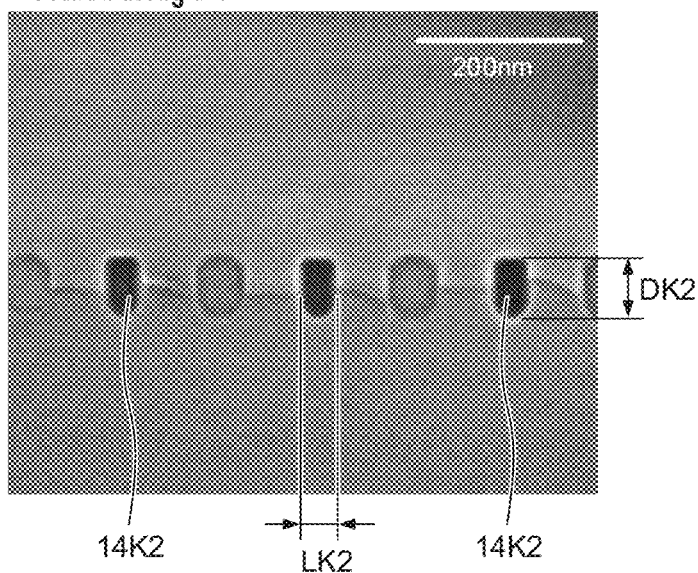
FIG. 6B is a SEM image illustrating a cross section taken along line B-B in FIG. 5.

FIG. 6A is a SEM image illustrating a cross section taken along line A-A in FIG. 5. FIG. 6B is a SEM image illustrating a cross section taken along line B-B in FIG. 5.

As illustrated in FIG. 5, the main air hole 14K1 had a major axis diameter LK1 of 75.2 nm and a minor axis diameter WK1 of 45 nm, where the ratio RK1 of the major axis diameter to the minor axis diameter (major axis diameter/minor axis diameter)=1.67. The sub-air hole 14K2 had a major axis diameter LK2 of 45.8 nm and a minor axis diameter WK2 of 39.2 nm, where the ratio RK2 of the major axis diameter to the minor axis diameter (major axis diameter/minor axis diameter)=1.17.

As illustrated in FIG. 6A and FIG. 6B, the main air hole 14K1 had a depth DK1 of 102 nm, and the sub-air hole 14K2 had a depth DK2 of 78.5 nm.

Thus, the formation of the photonic crystal layer 14P in which the air hole pairs each made up of the main air hole 14K1 and the sub-air hole 14K2 were arranged at the respective square lattice points with a period PC=164 nm was observed. In detail, the main air holes 14K1 were arranged at the respective square lattice points with a period PC, and the sub-air holes 14K2 were arranged at the respective square lattice points with the same period PC. The air hole pairs were arranged so that the center distance (i.e., inter-center-of-gravity distance) between the center-of-gravity D1 of the main air hole 14K1 and the center-of-gravity D2 of the sub-air hole 14K2 would be Δx (constant) in x direction and Δy (constant) in y direction.

Herein, the "inter-center-of-gravity distance" or "center distance" between the main air hole and the sub-air hole denotes the distance between the center-of-gravity axis of the main air hole and the center-of-gravity axis of the sub-air hole, and expressed as the distance by which the sub-air hole is separate from the main air hole in each of x direction and y direction.

The main air hole 14K1 and the sub-air hole 14K2 had a long-hexagonal prism shape with a major axis parallel to <11-20> axis. Although {1-102} facets appeared at the bottom (the substrate 12 side) of each of the main air hole 14K1 and the sub-air hole 14K2, the parts other than the bottom had a long-hexagonal prism shape.

Specifically, each of the distances Δx and Δy between the center-of-gravity D1 of the main air hole 14K1 and the center-of-gravity D2 of the sub-air hole 14K2 was 65.4 nm (Δx=Δy=0.4×PC), which was unchanged from before the embedding. The major axis of each of the main air hole 14K1 and the sub-air hole 14K2 was parallel to <11-20> axis (i.e., a axis).

Herein, the "major axis or minor axis" of an air hole (or hole) denotes the major axis or minor axis of a cross section (opening surface) of the air hole in a plane parallel to the photonic crystal layer.

The percentage of a value obtained by dividing the air hole area as seen in a direction orthogonal to the plane of the photonic crystal layer 14P by the square of the air hole period PC is referred to as an air-hole filling factor FF. The respective air hole filling factors FF1 and FF2 of the main air hole 14K1 and the sub-air hole 14K2 were calculated as FF1=10.5% and FF2=5.1%.

3. Element Characteristics, Evaluation 3.1 Dual lattice Structure and Single Lattice Structure (1) Comparative Example 1

As Comparative Example 1 for the PCSEL element 10 according to this embodiment, a PCSEL element in which single air holes (single lattice photonic crystal) were formed at respective lattice points was produced. The only difference from the foregoing production steps lies in S3b (air hole formation step), which will be described below.

FIG. 7 is a SEM image illustrating cylindrical holes CH formed in a GaN surface portion in Comparative Example 1. Specifically, holes CH having perfect circular openings of 80 nm in diameter were arranged at respective square lattice points with a period PC=164 nm in x direction and y direction.

In more detail, a resist patterned so that x axis and y axis as the air hole arrangement directions would be parallel to <1-100> axis (i.e., m axis) and <11-20> axis (i.e., a axis) respectively was formed. Dry etching was then performed using an ICP-RIE apparatus, to form cylindrical air holes 14C arranged in a square lattice configuration in x direction and y direction. The cylindrical air holes 14C were each 79 nm in diameter, and the period PC=164 nm.

(2) Threshold Gain (Coupled Wave Theory)

From the electric field intensity distribution in the basic mode in the structure in each of Example 1 and Comparative Example 1, the optical confinement factor ($\Gamma act$) of the active layer, and the optical confinement factor ($\Gamma mg$) of the Mg-doped layer (p contact layer, p cladding layer, electron blocking layer) were estimated. Moreover, the resonator loss ($\alpha_p$) in an in-plane direction of the photonic crystal layer 14P and the resonator loss ($\alpha_n$) in a direction perpendicular to the photonic crystal layer 14P were estimated using the two-dimensional coupled wave theory. The results are shown in Table 1.

In both Example 1 and Comparative Example 1, the absorption factor αmg of the Mg-doped layer was estimated to be 160 cm$^{-1}$. From $\Gamma mg$ and αmg, the absorption loss αi in each structure satisfying the following (Formula 1) was the value shown in Table 1.

$$\alpha i = \Gamma mg \times \alpha mg \quad \text{(Formula 1)}.$$

The threshold gain Gth of the laser was calculated according to (Formula 2), and was estimated to be 1119 cm$^{-1}$ in Example 1 and 724 cm$^{-1}$ in Comparative Example 1 as illustrated in Table 1.

$$\Gamma act \cdot Gth = \alpha_p + \alpha_n + \alpha i \quad \text{(Formula 2)}.$$

TABLE 1

Optical Loss in Example 1 and Comparative Example 1

| | $\Gamma_{act}$ | $\Gamma_{mg}$ | $\alpha_p$ | $\alpha_n$ | $\alpha_i$ | $G_{th}$ |
|---|---|---|---|---|---|---|
| Example 1 | 3.96% | 11.24% | 12.2 cm$^{-1}$ | 14.6 cm$^{-1}$ | 18.0 cm$^{-1}$ | 1119 cm$^{-1}$ |
| Comparative Example 1 | 3.69% | 8.61% | 10.8 cm$^{-1}$ | 2.36 cm$^{-1}$ | 13.8 cm$^{-1}$ | 724 cm$^{-1}$ |

In Table 1, an in Example 1 is greater than $α_n$ in Comparative Example 1. This is because the rotational symmetry of the lattice point structure was broken due to the dual lattice structure. In Comparative Example 1, since the lattice point structure had twofold rotational symmetry, the light diffracted in the vertical direction among the light propagating in the air hole layer was canceled by vanishing interference. In Example 1, since the rotational symmetry was lower, this vanishing interference was weaker, so that a larger amount of light was diffracted in the vertical direction. That is, $α_n$ increased. In other words, to increase $α_n$, it is desirable that the lattice point structure is onefold rotational symmetry, that is, the air hole set of the main air hole 14K1 and the sub-air hole 14K2 is shaped and arranged so as to match themselves by 3600 rotation.

(3) Light Output Characteristics, Light Emission Spectrum

Figure 8A:
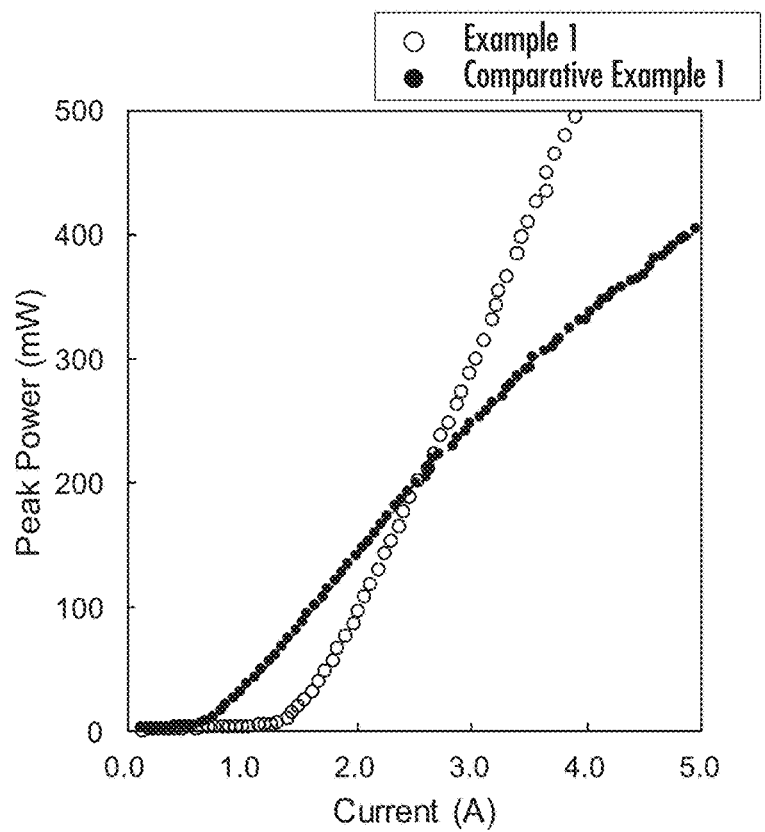
FIG. 8A is a diagram illustrating the I-L characteristics of each of a PCSEL element 10 in Example 1 and a PCSEL element in Comparative Example 1.
Figure 8B:
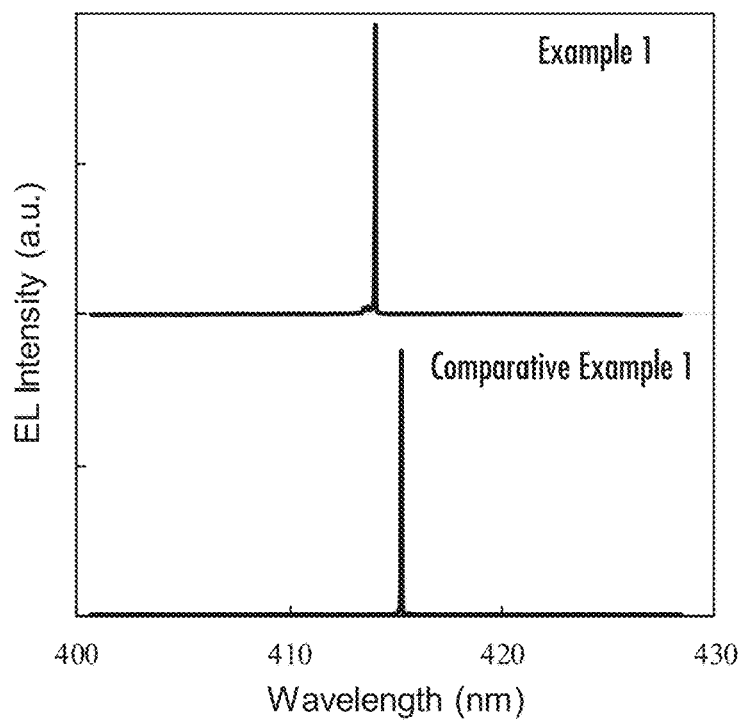
FIG. 8B is a diagram illustrating the light emission spectrum of each of the PCSEL element 10 in Example 1 and the PCSEL element in Comparative Example 1 around threshold current.

FIG. 8A illustrates the I-L characteristics (current-light output characteristics) of each of the PCSEL element 10 in Example 1 and the PCSEL element in Comparative Example 1. FIG. 8B illustrates the light emission spectrum of each of the PCSEL element 10 in Example 1 and the PCSEL element in Comparative Example 1 around threshold current. The measurement was performed by pulse current driving of a pulse width of 100 ns and a pulse period of 1 kHz.

The PCSEL element 10 in Example 1 performed highly unimodal laser oscillation at a threshold current of 1.24 A (threshold current density: 3.9 kA/cm$^2$). The PCSEL element in Comparative Example 1 performed highly unimodal laser oscillation at a threshold current of 0.71 A (threshold current density: 2.2 kA/cm$^2$). The reason why the threshold current in Example 1 was greater than that in Comparative Example 1 is because of the increase of the threshold gain Gth in Table 1. In Example 1 and Comparative Example 1, the rate of increase of the threshold gain Gth and the rate of increase of the threshold current are approximately equal. Hence, it is considered that the increase of the threshold current is due to the increase of the resonator loss and the absorption loss, and the quality of the active layer is unaffected even in the case where the dual lattice structure is introduced as in Example 1.

The slope efficiency of the PCSEL element 10 in Example 1 was 0.23 W/A, which is a significant increase from 0.10 W/A in Comparative Example 1. This is because, in Example 1, $α_n$ (i.e., light leakage in the vertical direction=optical component contributing to output) was large as described above and therefore the amount of light that can be extracted as output was large. Thus, by forming the lattice points in the air hole layer into a dual lattice structure, large output can be obtained with lower current.

3.2 Arrangement Relationship Between Main Air Hole and Sub-Air Hole in Dual Lattice Structure Example 2

(1) Example 2 and Comparative Example 2

To evaluate the surface shape after embedding in the case of introducing the dual lattice structure, photonic crystal layers of two structures were produced and the steps to S3d were performed in the same way as in the foregoing Example to embed the air holes.

In more detail, the two structures examined were the same in the sizes and shapes of the main air hole and sub-air hole, but were different in the major axis direction of each of the main air hole and the sub-air hole, that is, the major axis direction was different by 900 between the two structures.

Figure 9A:
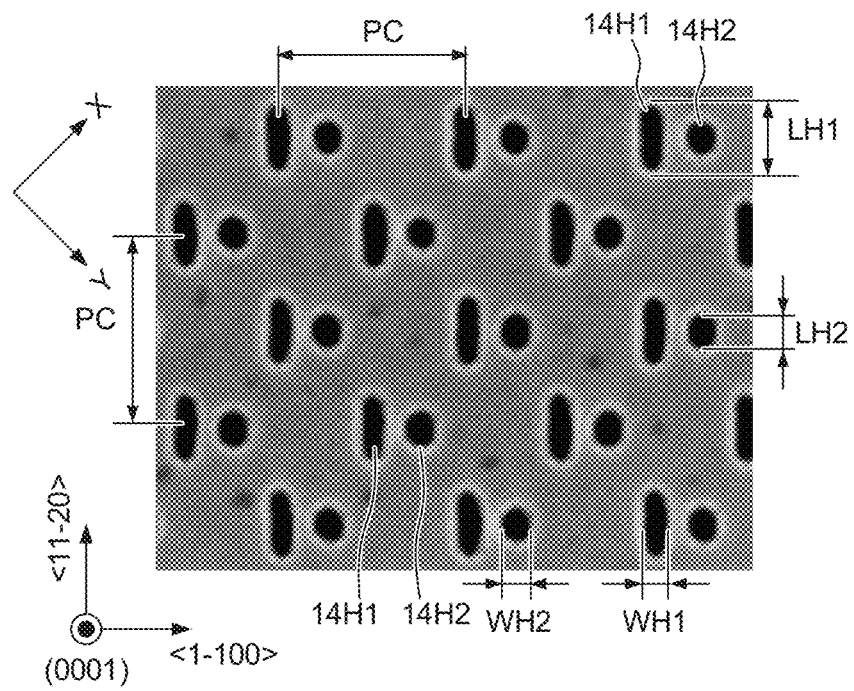
FIG. 9A is a top surface SEM image illustrating main holes 14H1 and sub-holes 14H2 in a structure (structure A) in which main holes and sub-holes are formed in the same way as in Example 1.

FIG. 9A is a top surface SEM image illustrating main holes 14H1 and sub-holes 14H2 formed in a GaN surface portion in a structure (structure A) in which main holes and sub-holes were formed in the same way as in the foregoing Example 1. Specifically, in the structure A (Example 2), hole pairs each made up of an elliptic cylindrical main hole 14H1 having a major axis diameter/minor axis diameter ratio of 2.75 (=79.8 nm/29 nm) and an elliptic cylindrical sub-hole 14H2 having a major axis diameter/minor axis diameter ratio of 1.14 (=42.8 nm/37.6 nm) were formed in a square lattice configuration with a period PC=164 nm.

Figure 9B:
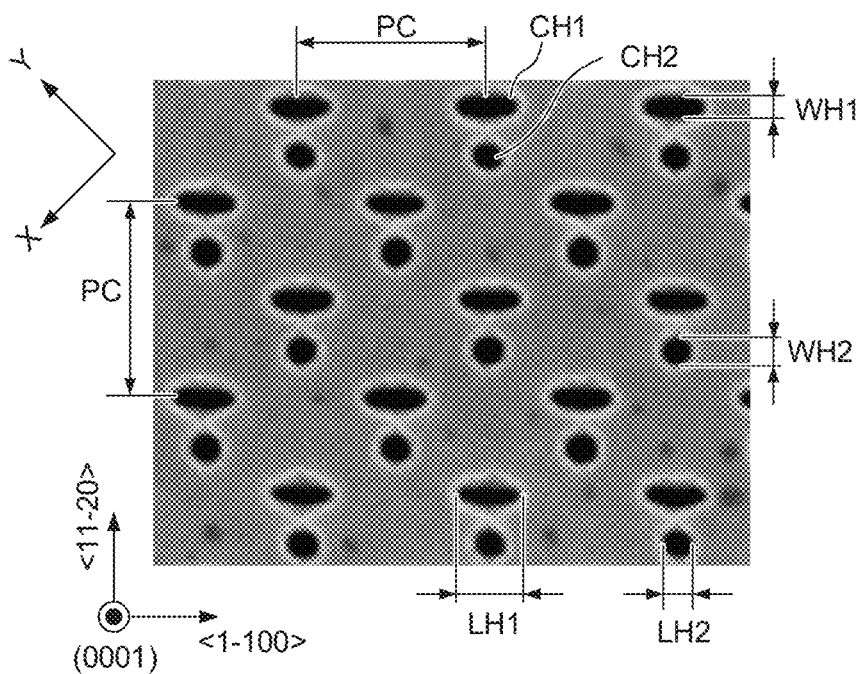
FIG. 9B is a top surface SEM image illustrating main holes CH1 and sub-holes CH2 in Comparative Example 2 (structure B).

FIG. 9B is a top surface SEM image illustrating main holes CH1 and sub-holes CH2 formed in a GaN surface portion in Comparative Example 2. In Comparative Example 2 (structure B), hole pairs each made up of an elliptic cylindrical main hole CH1 having a major axis diameter/minor axis diameter ratio of 2.76 (=79.4 nm/28.8 nm) and an elliptic cylindrical sub-hole CH2 having a major axis diameter/minor axis diameter ratio of 1.10 (=41.8 nm/37.9 nm) were formed in a square lattice configuration with a period PC=164 nm.

In the structure A (FIG. 9A), the major axis of each of the main hole 14H1 and the sub-hole 14H2 was parallel to <11-20> axis (i.e., a axis). In the structure B (FIG. 9B), the major axis of each of the main hole CH1 and sub-hole CH2 was orthogonal to <11-20> axis (i.e., a axis).

That is, the structure A (Example 2) and the structure B (Comparative Example 2) were substantially the same in the sizes and shapes of the main hole and sub-hole, but the major axis direction of each hole in the structure B (Comparative Example 2) was 900 different from the major axis direction of each hole in the structure A (Example 2).

Figure 11A:
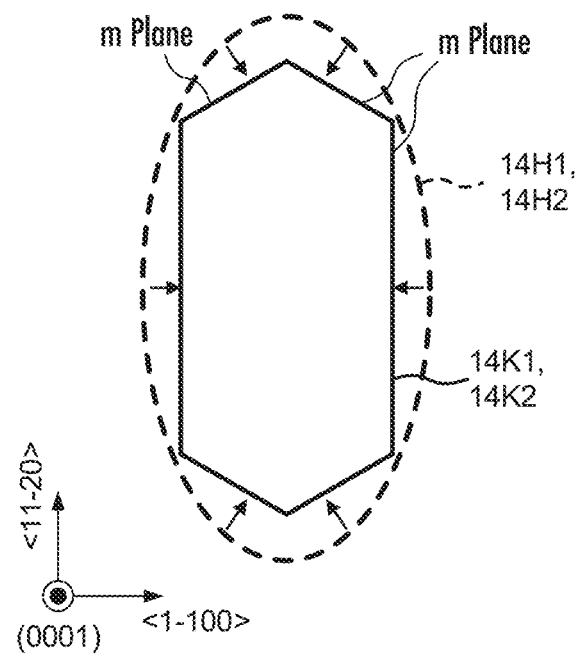
FIG. 11A is a top view schematically illustrating a shape change of a hole in an embedding layer formation process in the structure A (Example 2).

Accordingly, as a result of embedding the main hole 14H1 and the sub-hole 14H2 in the structure A, the photonic crystal layer 14P in which the major axis of each of the main air hole 14K1 and the sub-air hole 14K2 was parallel to <11-20> axis was obtained (see FIG. 11A). As a result of embedding the main hole CH1 and the sub-hole CH2 in the structure B, the photonic crystal layer in which the major axis of each of the main air hole CK1 and the sub-air hole CK2 was orthogonal to <11-20> axis was obtained (see FIG. 11B).

(2) Surface Roughness of Embedding Layer

Figure 10A:
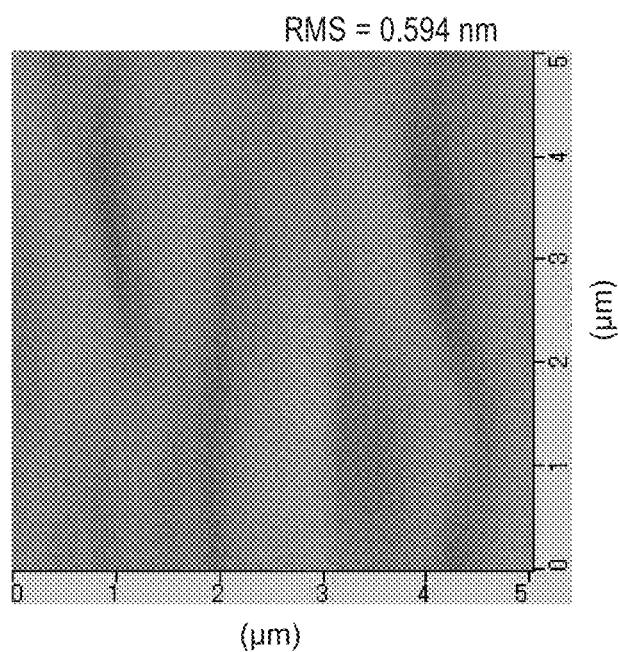
FIG. 10A is an AFM image illustrating the surface morphology of an embedding layer after embedding the main air holes and the sub-air holes in the structure A (Example 2).
Figure 10B:
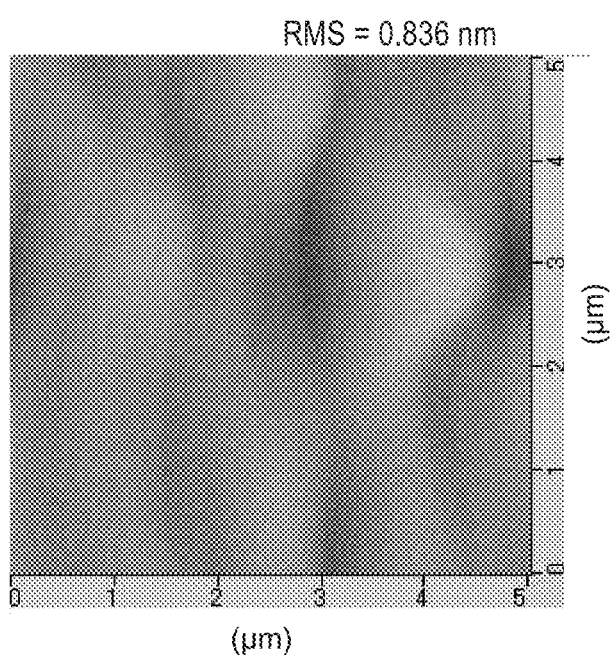
FIG. 10B is an AFM image illustrating the surface morphology of an embedding layer after embedding the main air holes and the sub-air holes in the structure B (Comparative Example 2).

FIG. 10A and FIG. 10B are AFM (atomic force microscope) images illustrating the surface morphology of the embedding layer after embedding the main air holes and the sub-air holes in the structure A (Example 2) and the structure B (Comparative Example 2), respectively. The horizontal axis direction in the AFM image is m axis, and the vertical axis direction in the AFM image is a axis.

As illustrated in FIG. 10A, in the case where the major axis of each air hole was parallel to a axis (<11-20> axis) (structure A: Example 2), a flat surface with a surface roughness (RMS) of 0.594 nm was obtained.

As illustrated in FIG. 10B, in the case where the major axis of each air hole was orthogonal to a axis (structure B: Comparative Example 2), waviness with a height of about 7 nm appeared on the surface, and the surface roughness (RMS 0.836 nm) was higher than that in the structure A (Example).

When the active layer is grown on the embedding layer whose surface has such large irregularities, the In composition becomes non-uniform in the uneven parts, as a result of which the active layer quality deteriorates. This causes the threshold current to increase. Therefore, the major axis of each air hole in the photonic crystal layer is preferably parallel to a axis.

Figure 11B:
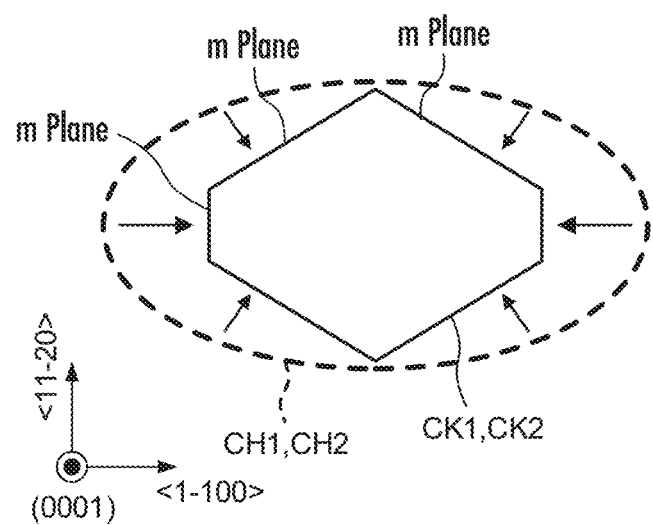
FIG. 11B is a top view schematically illustrating a shape change of a hole in an embedding layer formation process in the structure B (Comparative Example 2).

FIG. 11A and FIG. 11B are each a top view schematically illustrating a shape change of a hole in in the embedding layer formation process. The difference in the surface roughness of the embedding layer between the case where the major axis of the hole is parallel to a axis of crystal orientation and the case where the major axis of the hole is orthogonal to a axis will be examined below, with reference to these drawings.

When embedding a hole in group-3 nitride, mass transport occurs and as a result the hole shape changes to a shape formed by a thermally stable plane to thus form an air hole. In detail, in the +c-plane substrate, the side surfaces of the hole change in shape to {1-100} plane (i.e., m plane). That is, the hole changes from an elliptic cylindrical shape to a long-hexagonal prism shape with the side surfaces formed by m planes.

FIG. 11A schematically illustrates the shape change of the air hole in the case where the major axis of the elliptic cylindrical hole is parallel to a axis (<11-20> axis) (structure A). The holes 14H1 and 14H2 are each reduced in air hole size after deformation, but group-3 nitride atoms corresponding to the change are supplied from the surrounding crystal portions by mass transport (arrows in the drawing). The holes 14H1 and 14H2 respectively change to long-hexagonal prism-shaped air holes 14K1 and 14K2 inscribed in the shapes of the original holes 14H1 and 14H2.

FIG. 11B schematically illustrates the shape change of the air hole in the case where the major axis of the elliptic cylindrical hole is orthogonal to a axis (structure B). The holes CH1 and CH2 are each reduced in air hole size due to mass transport (arrows in the drawing). This shape change is greater than that of the air hole whose major axis is parallel to a axis (FIG. 11A).

In a multiple lattice photonic crystal, the distance between air holes is shorter than in a single lattice photonic crystal, and accordingly adjacent air holes (i.e., main air hole and sub-air hole) are arranged with a distance approximately equivalent to an air hole size. Therefore, if the air holes change in shape due to mass transport, the shape changes of adjacent air holes interfere with each other. The embedding surface develops large irregularities (height differences) between the part where the shape changes interfered with each other and the part where the shape changes did not interfere with each other. Hence, in the case where the major axis of the hole is orthogonal to a axis as illustrated in FIG. 11B, a large shape change occurs, which causes a rough surface. In the case where the major axis of the hole is parallel to a axis, on the other hand, the shape change can be minimized, so that a flat surface can be obtained after embedding.

(3) Positional Relationship between Main Air Hole and Sub-Air Hole and Resonator Loss In the case where the air holes are arranged in a square lattice configuration in the air hole layer (photonic crystal layer), it is preferable to have the same feedback effect (diffraction efficiency) in the x axis direction and the y axis direction in order to prevent uneven distribution of light depending on the direction and stably obtain laser oscillation at a single wavelength in the two-dimensional photonic crystal.

In detail, it is preferable that the two-dimensional photonic crystal forming the air hole layer is symmetric with respect to an axis inclined 45° from x axis and y axis of the square lattice. In the case where the main air hole 14K1 and the sub-air hole 14K2 are symmetric with respect to an axis inclined 45° from x axis and y axis, it is preferable that the center distances Δx and Δy between the main air hole 14K1 and the sub-air hole 14K2 respectively in the x axis direction and the y axis direction are equal (Δx=Δy).

Figure 12A:
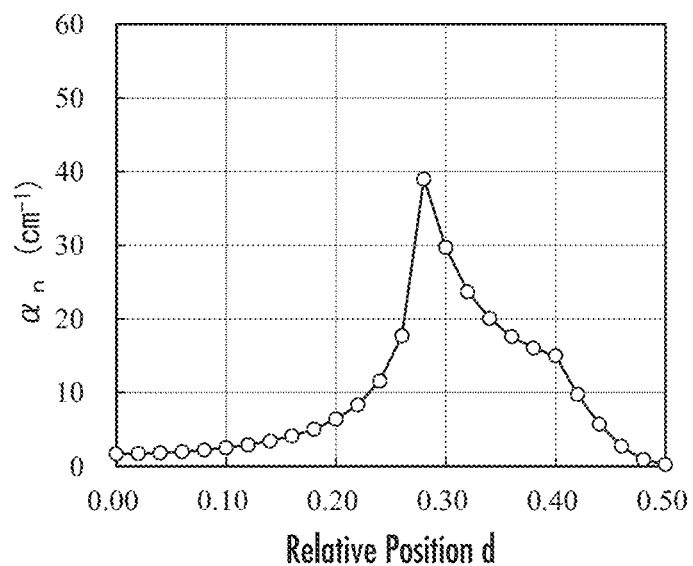
FIG. 12A is a graph illustrating resonator loss $\alpha_n$ in a vertical direction when changing the relative positions $\Delta x$ and $\Delta y$ ($\Delta x=\Delta y$) of the sub-air hole 14K2 to the main air hole 14K1 from 0.0 PC to 0.5 PC in the structure in Example 1.
Figure 12B:
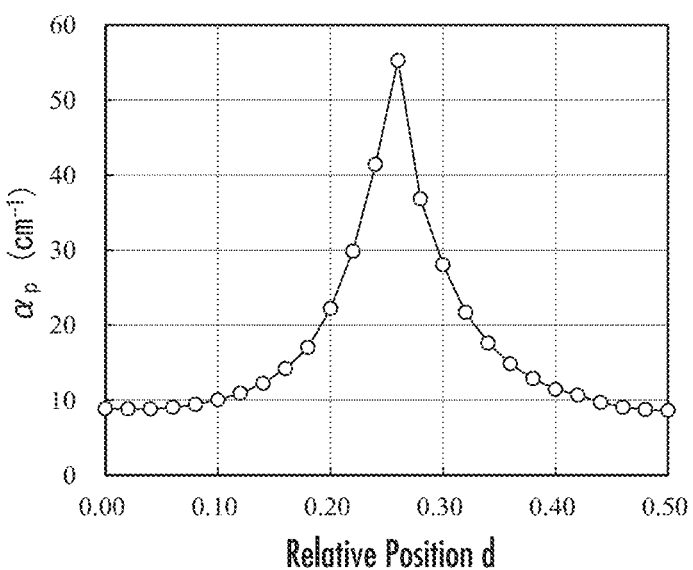
FIG. 12B is a graph illustrating resonator loss $\alpha_p$ in a horizontal direction when changing the relative positions $\Delta x$ and $\Delta y$ ($\Delta x=\Delta y$) of the sub-air hole 14K2 to the main air hole 14K1 from 0.0 PC to 0.5 PC in the structure in Example 1.

FIG. 12A and FIG. 12B illustrate the resonator losses $\alpha_n$ and $\alpha_p$ in the vertical and horizontal directions for the photonic crystal layer 14P when, in the structure in Example 1, changing the center distances Δx and Δy between the main air hole 14K1 and the sub-air hole 14K2 forming the photonic crystal layer 14P from 0.0 PC to 0.5 PC (PC is the period of the square lattice), where Δx=Δy. The horizontal axis represents the proportion d to the period PC (i.e., d=Δx/PC=Δy/PC).

FIG. 12C illustrates $R_n$ calculated from the following (Formula 3). $R_n$ is the proportion of the resonator loss $\alpha_n$ in the vertical direction to the total resonator loss ($\alpha_p+\alpha_n$).

$$R_n=\alpha_n/(\alpha_p+\alpha_n) \quad \text{(Formula 3)}.$$

In the photonic-crystal surface-emitting laser, the slope efficiency ηSE is proportional to the proportion of $\alpha_n$ (resonator loss in the vertical direction) to the total loss including absorption loss αi, as indicated in (Formula 4).

[Math. 1]

$$\eta SE \propto \alpha_n/(\alpha_p+\alpha_n+\alpha i) \quad \text{(Formula 4)}.$$

Accordingly, if the absorption loss αi by the constituent materials can be reduced to zero, ηSE is proportional to $R_n$. Hence, it is desirable to increase $R_n$ in order to enhance the emission efficiency (i.e., ηSE) of the photonic-crystal surface-emitting laser and obtain a photonic-crystal surface-emitting laser capable of higher output.

$R_n$ in the conventional single lattice photonic-crystal surface-emitting laser (Comparative Example 1) is about 0.18 from Table 1. To achieve higher $R_n$ in the dual lattice photonic-crystal surface-emitting laser (Example 1) than in the conventional laser ($R_n$=0.18), the relative position d (=Δx/PC=Δy/PC) of the sub-air hole to the main air hole is preferably 0.06 or more and or 0.47 or less, with reference to FIG. 12C.

(4) Oscillation Mode

With reference to FIG. 12C, $R_n$ changes discontinuously when the center distances Δx and Δy (Δx=Δy) between the main air hole 14K1 and the sub-air hole 14K2 is 0.28×PC and when the center distances Δx and Δy (Δx=Δy) between the main air hole 14K1 and the sub-air hole 14K2 is 0.40×PC. This is because the oscillation mode changes at these center distances.

Figure 13:
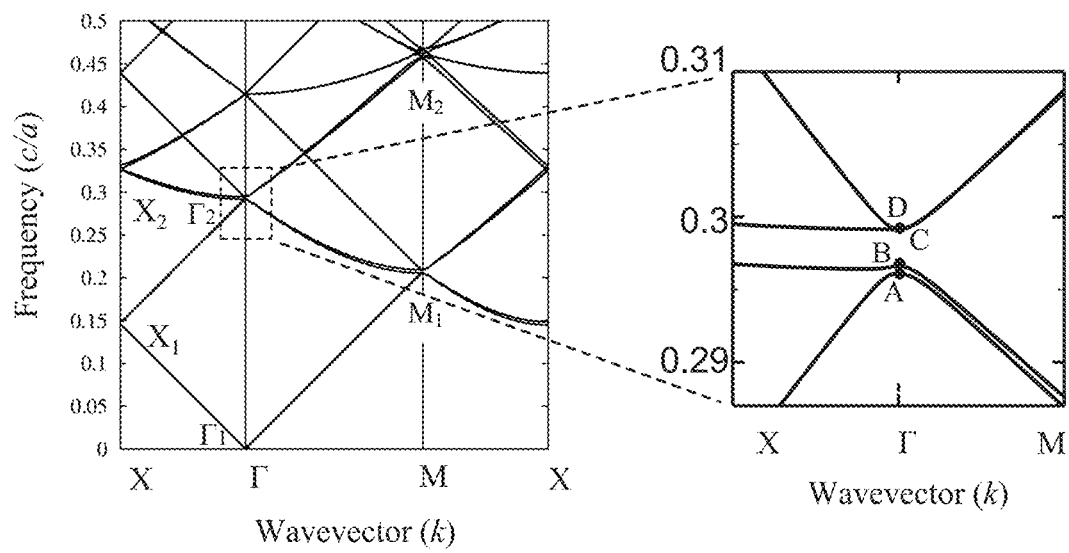
FIG. 13 is a diagram illustrating the photonic band structure of a square lattice photonic crystal around Γ point.

FIG. 13 illustrates the photonic band structure of the square lattice photonic crystal around Γ point. In the photonic-crystal surface-emitting laser, the standing wave state of light at the band edges of Γ point of the photonic band structure of the air hole layer is used as the resonance effect. At the band edges of Γ point, there are four band edge modes (indicated by black circles) A, B, C, and D from the low frequency side. Laser oscillation is obtained in the mode with the lowest threshold gain (smaller resonator loss) of the four band edge modes.

Figure 14:
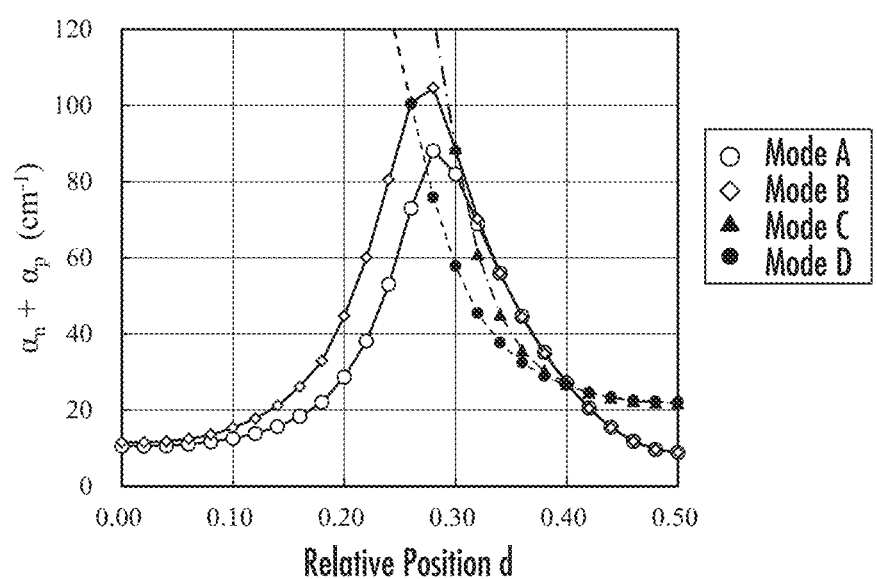
FIG. 14 is a graph illustrating the threshold gain (resonator loss) in each mode determined by the coupled wave theory when changing $\Delta x$ and $\Delta y$ in Example 1.

FIG. 14 illustrates the threshold gain (resonator loss) in each mode determined by the coupled wave theory when changing the center distances Δx and Δy in Example 1. As illustrated in the drawing, the mode with the lowest threshold gain is mode A at 0.28×PC or less (d≤0.28), mode D at 0.28 PC to 0.40 PC (0.28<d<0.40), and mode B at 0.40 PC or more (0.40≤d).

Figure 15:
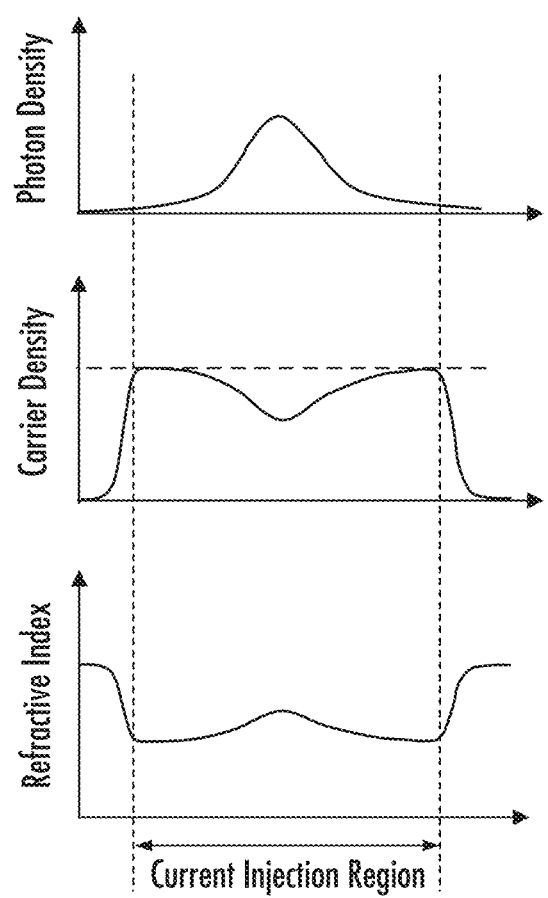
FIG. 15 is a diagram schematically illustrating the refractive index, the carrier density, and the photon density in a current injection region.

FIG. 15 schematically illustrates the refractive index, the carrier density, and the photon density in the current injection region during laser oscillation of the surface-emitting laser. In a group-3 nitride semiconductor, the refractive index in the current injection region typically decreases due to the carrier plasma effect. In a semiconductor laser, on the other hand, the stimulated emission rate increases and the carrier density decreases in the center of the resonator with high photon density, and the temperature in the central part rises due to heat generation, so that the refractive index in the central part of the current injection region is higher than that in the surroundings.

Figure 16A:
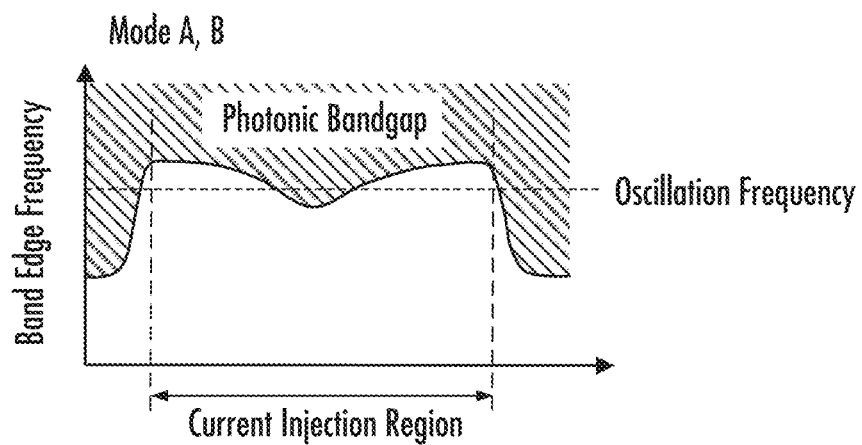
FIG. 16A is a diagram schematically illustrating the frequency of the photonic band edge near the current injection region in band edge modes A and B.
Figure 16B:
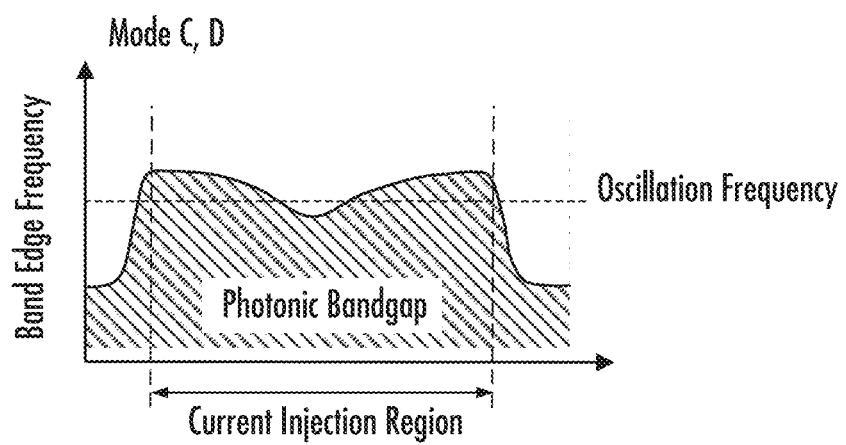
FIG. 16B is a diagram schematically illustrating the frequency of the photonic band edge near the current injection region in band edge modes C and D.

FIG. 16A schematically illustrates the frequency of the photonic band edge of Γ point near the current injection region during current injection in band edge modes A and B. FIG. 16B schematically illustrates the frequency of the photonic band edge of Γ point near the current injection region during current injection in band edge modes C and D.

The frequency ω is expressed as in (Equation 5) using the refractive index n, the speed of light c, and the wave number k.

$$\omega = c/n \times k \qquad \text{(Formula 5)}.$$

From (Formula 5), when the refractive index distribution changes as a result of current injection (laser oscillation) as illustrated in FIG. 15, the frequency profile of each of the band edge modes A, B, C, and D changes (from a trapezoidal shape to a trapezoidal shape having a concave center) with the refractive index change, as illustrated in FIG. 16A and FIG. 16B.

As illustrated in FIG. 16A, in band edge modes A and B (hereafter also simply referred to as modes A and B), the oscillation mode frequency is within the photonic bandgap in the central part of the current injection region. Therefore, the presence of photons in the central part of the injection region is suppressed, and photons are generated in a region outside the central part of the injection region.

FIG. 17A schematically illustrates the refractive index, the carrier density, and the photon density in the current injection region in oscillation operation in band edge modes A and B. The solid line indicates the case where the photonic band effect is taken into consideration and the dashed line indicates the case where the photonic band effect is not taken into consideration.

In the case where the photonic band effect is taken into consideration, in modes A and B, photons are distributed in a wider region as mentioned above, and the photon density is flattened throughout the current injection region with an increase in injection current.

In response to this, the carrier density and the refractive index are uniformized throughout the current injection region. Thus, in oscillation operation in band edge modes A and B, even in the case where high current is injected to perform high output operation, the photon density distribution is flattened throughout the injection region with the current increase, so that the emitted beam has a stable beam pattern.

As illustrated in FIG. 16B, in band edge modes C and D, the oscillation mode frequency is within the bandgap in the region outside the central part of the current injection region. Therefore, photons are locally present in the central part of the injection region.

FIG. 17B schematically illustrates the refractive index, the carrier density, and the photon density in the current injection region in oscillation operation in band edge modes C and D. The solid line indicates the case where the photonic band effect is taken into consideration and the dashed line indicates the case where the photonic band effect is not taken into consideration.

In the case where the photonic band effect is taken into consideration, photons concentrate and locally exist in the central part of the current injection region. Accordingly, the carrier density and the refractive index greatly change locally in the central part of the current injection region, and have a non-uniform distribution in the current injection region.

Thus, in oscillation operation in band edge modes C and D, in the case where high current is injected to perform high output operation, the photon density distribution is localized and concentrated with the current increase, so that the emitted beam has an unstable beam pattern. Moreover, when high current is injected, the distributions of the carrier density and the refractive index become significantly non-uniform, as a result of which oscillation tends to switch among multiple modes. Consequently, stable oscillation cannot be achieved.

As described above, to achieve stable oscillation when high current is injected, it is preferable to perform oscillation in modes A and B, and the relative position d (=Δx/PC=Δy/PC) of the sub-air hole 14K2 to the main air hole 14K1 is preferably 0.06 PC to 0.28 PC (0.06≤d≤0.28) or 0.40 PC to 0.47 PC (0.40≤d≤0.47).

Example 3

In Example 3, a PCSEL element 10 including an air hole layer (photonic crystal layer) of a dual lattice structure including two regular-hexagonal prism-shaped main air hole 14K1 and the sub-air hole 14K2 was examined.

1. Production Steps

The production steps of the PCSEL element 10 in Example 3 will be described in detail below. The main points and the differences from the production steps in the foregoing example will be described below. The structure of the PCSEL element 10 and the layer structure of the semiconductor structure layer 11 are the same as those illustrated in FIG. 1A.

[S3b: Hole and Air Hole Formation Step]

A growth layer-containing substrate in which an n-type GaN layer as a preparation layer of the n-guide layer 14 had been grown was cleaned to obtain a clean surface. The n-type GaN growth layer is a preparation layer for forming the layer composed of the lower guide layer 14A and the photonic crystal layer 14P.

After the surface of the growth layer-containing substrate was cleaned, a silicon nitride film ($Si_xN_y$) was deposited on the clean surface using plasma CVD. An electron beam drawing resist was applied thereon by spin coating, and a two-dimensional periodic structure was patterned in an electron beam (EB) drawing apparatus.

Thus, patterning was performed with each opening pair of a main opening K1 and a sub-opening K2 smaller than the main opening K1 in an approximately circular shape being two-dimensionally arranged in the plane of the resist at square lattice points with a period PC=164 nm (see FIG. 3).

In more detail, the main opening K1 was arranged with its center-of-gravity CD1 being at a square lattice point with a period PC=164 nm in two directions (x direction and y direction) orthogonal to each other. Likewise, the sub-opening K2 was arranged with its center-of-gravity CD2 being at a square lattice point with a period PC=164 nm in x direction and y direction.

The main opening K1 had a major axis diameter of 76 nm and a minor axis diameter of 66 nm (major axis diameter/minor axis diameter=1.15), and the sub-opening K2 had a major axis diameter of 59 nm and a minor axis diameter of 51 nm (major axis diameter/minor axis diameter=1.12). The patterning was performed so that the major axis of each opening would be parallel to <11-20> axis (i.e., a axis).

The patterning was performed so that the center distances $\Delta x=\Delta y$ between the main opening K1 and the sub-opening K2 in x direction and y direction would be 65.6 nm (=0.4×164 nm).

After the patterned resist was developed, the $Si_xN_y$ film was selectively dry etched in an ICP-RIE apparatus. The main openings K1 and the sub-openings K2 arranged at square lattice points with a period of 164 nm were thus formed through the $Si_xN_y$ film.

Although the main opening K1 and the sub-opening K2 each have an elliptic shape which slightly deviates from a perfect circular shape, the main opening K1 and the sub-opening K2 may be formed to have a perfect circular shape.

Subsequently, the resist was removed, and holes were formed on the GaN surface using the patterned $Si_xN_y$ film as a hard mask. A plurality of hole pairs 14H (main hole 14H1 and the sub-hole 14H2) perpendicular to the GaN surface were formed by dry-etching GaN in the ICP-RIE apparatus using chlorine-based gas.

[S3c: Cleaning Step]

Figure 18:
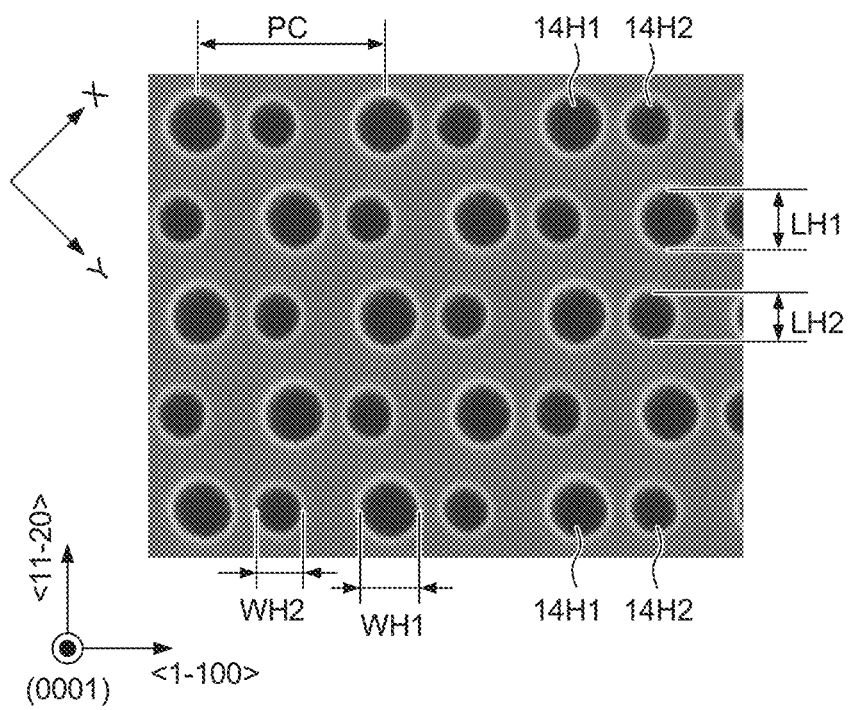
FIG. 18 is a SEM image of a GaN surface on which holes 14H1 and 14H2 are formed.

The substrate in which the holes 14H1 and 14H2 were formed was subjected to degreasing, and then the $Si_xN_y$ film was removed using buffered hydrofluoric acid (HF). FIG. 18 illustrates a SEM image of the GaN surface in this stage.

As illustrated in FIG. 18, a plurality of hole pairs 14H (main hole 14H1 and sub-hole 14H2) arranged in a square lattice configuration, i.e., two-dimensionally arranged at square lattice points, with a period PC of 164 nm were formed. The holes 14H1 and 14H2 were approximately cylindrical holes open to the top surface (GaN surface).

In more detail, the opening of the main hole 14H1 at the GaN surface had a major axis diameter LH1 of 76 nm and a minor axis diameter WH1 of 68 nm where RH1 (=major axis diameter/minor axis diameter)=1.12 in the GaN surface, and the opening of the sub-hole 14H2 had a major axis diameter LH2 of 59 nm and a minor axis diameter WH2 of 53 nm where RH2 (=major axis diameter/minor axis diameter)=1.11 in the GaN surface.

Here, the distance between the center-of-gravity CD1 of the main hole 14H1 and the center-of-gravity CD2 of the sub-hole 14H2 in each of x direction and y direction was 65.3 nm (=0.4×PC). The major axis of each of the main hole 14H1 and the sub-hole 14H2 was parallel to <11-20> axis (i.e., a axis).

Although the main hole 14H1 and the sub-hole 14H2 each have an elliptic cylindrical shape which slightly deviates from a perfectly circular cylindrical shape, the main opening K1 and the sub-opening K2 may be formed to have a perfectly circular cylindrical shape.

[S3d: Embedding Layer Formation Step]

The substrate was put into the reactor of the MOVPE apparatus again. Ammonia ($NH_3$) was supplied, the temperature of the substrate was increased to 950° C. (first embedding temperature), and then trimethylgallium (TMG) and $NH_3$ were supplied to close the openings of the main hole 14H1 and the sub-hole 14H2 to form a first the embedding layer 14B1.

In this temperature region, the N polar surface was selectively grown because N atoms were attached to the outermost surface of the growth substrate. Hence, {1-101} facets were selectively grown on the surface. As a result of facing {1-101} facets collide with each other, the holes were closed and embedded into the GaN layer.

Then, after the main hole 14H1 and the sub-hole 14H2 were closed, the second embedding layer 14B2 of 50 nm in thickness was grown. The growth of the second embedding layer 14B2 was carried out by decreasing the substrate temperature to 820° C. (second embedding temperature) and then supplying triethylgallium (TEG) and trimethylindium (TMI) as group-3 atom sources and supplying $NH_3$ as a nitrogen source.

The In composition of the second embedding layer 14B2 was 2% (i.e., $Ga_{0.98}In_{0.02}N$ layer). The second embedding layer 14B2 functions as a light distribution adjusting layer for adjusting the bonding efficiency (optical field) between light and the photonic crystal layer 14P.

[S4: Light-Emitting Layer Formation Step]

Next, a multiple quantum well (MQW) layer was grown as the active layer 15 which is the light-emitting layer. In more detail, the MQW layer included GaN barrier layers and InGaN well layers, as in the foregoing example. The barrier layers were grown by decreasing the temperature of the substrate to 820° C. and then supplying triethylgallium (TEG) as a group-3 atom source and $NH_3$ as a nitrogen source. The well layers were grown at the same temperature as with the barrier layers, by supplying TEG and trimethylindium (TMI) as group-3 atom sources and $NH_3$ as a nitrogen source. The center wavelength of PL emission from the active layer in this example was 412 nm.

S5 (p-side guide layer formation step) was followed by the same steps as the foregoing production steps, as a result of which the PCSEL element 10 in Example 3 was formed.

2. Main Air Hole and Sub-Air Hole

Figure 19A:
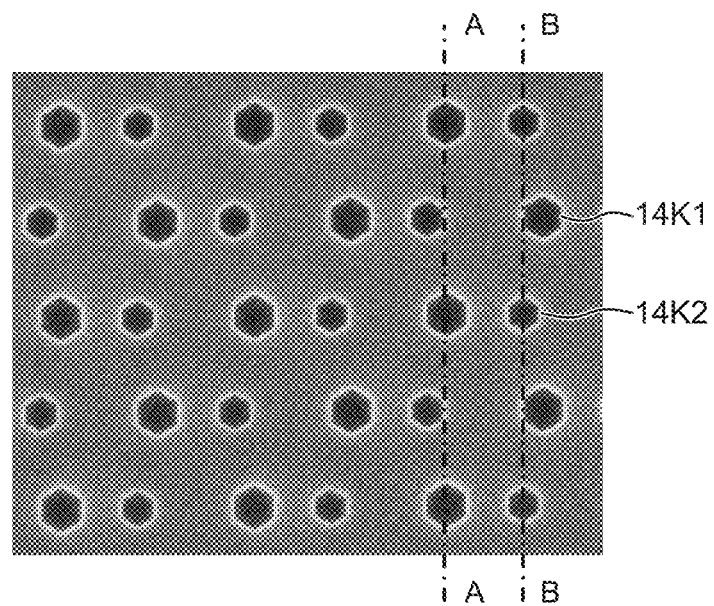
FIG. 19A is a SEM image of a guide layer top surface illustrating the air hole shapes of the main air hole 14K1 and the sub-air hole 14K2 in Example 3.

To determine the shapes of the embedded air holes in this example, the laminate structure was processed from the surface by a FIB until the air holes in the air hole layer were exposed, and then SEM observation was performed. FIG. 19A is a top surface SEM image illustrating the air hole shapes of the main air hole 14K1 and the sub-air hole 14K2 smaller in size than the main air hole 14K1. The sub-air hole 14K2 is smaller than the main air hole 14K1 in air hole diameter and/or depth.

Figure 19B:
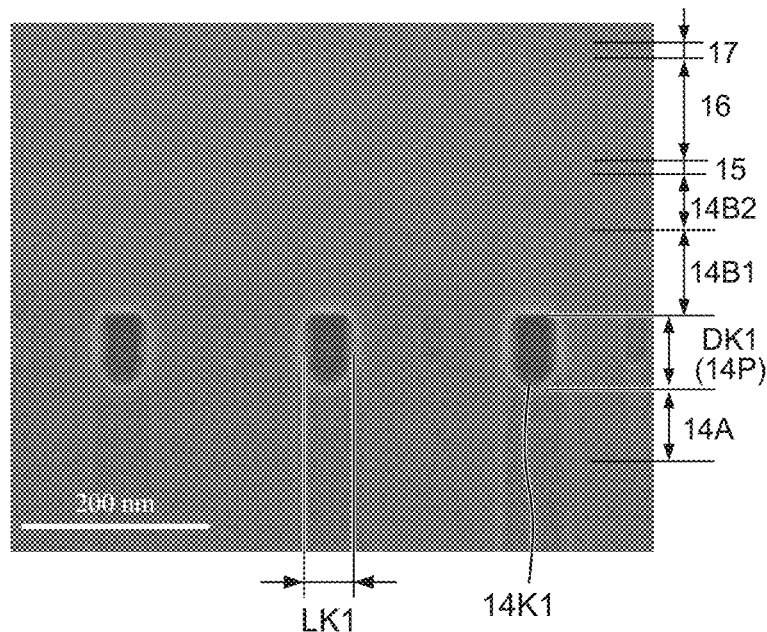
FIG. 19B is a SEM image illustrating a cross section taken along line A-A in FIG. 19A.
Figure 19C:
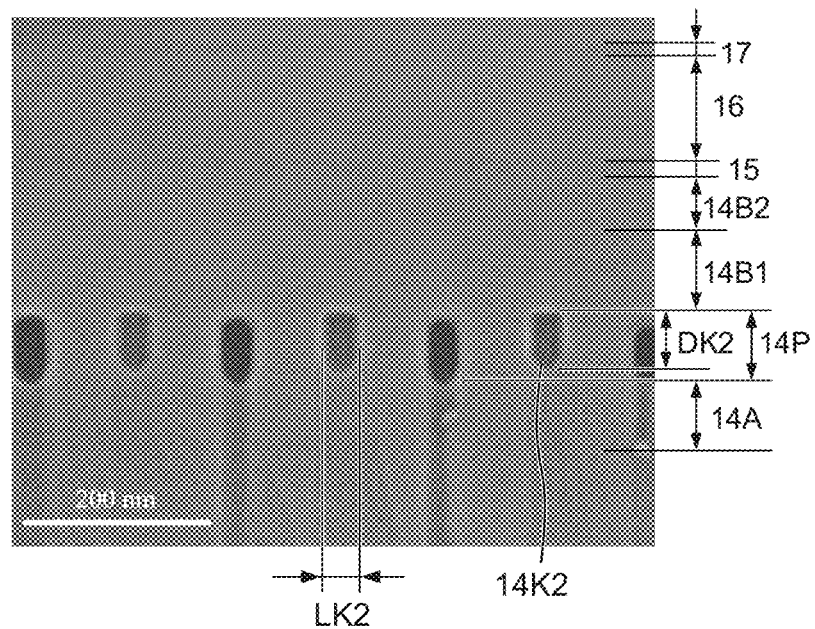
FIG. 19C is a SEM image illustrating a cross section taken along line B-B in FIG. 19A.

FIG. 19B is a SEM image illustrating a cross section taken along line A-A in FIG. 19A. FIG. 19C is a SEM image illustrating a cross section taken along line B-B in FIG. 19A.

As illustrated in FIG. 19A, the main air hole 14K1 and the sub-air hole 14K2 were hexagonal in shape. As a result of SEM observation, the main air hole 14K1 had a major axis diameter LK1 of 57.2 nm and a minor axis diameter WK1 of 49.5 nm, where the ratio RK1 of the major axis diameter to the minor axis diameter (major axis diameter/minor axis diameter)=1.15. The main air hole 14K1 had a depth DK1 of 91.3 nm.

The sub-air hole 14K2 had a major axis diameter LK2 of 43.5 nm and a minor axis diameter WK2 of 37.7 nm, where the ratio RK2 of the major axis diameter to the minor axis diameter (major axis diameter/minor axis diameter)=1.15. The sub-air hole 14K2 had a depth DK2 of 79.4 nm.

Since the ratio of the major axis diameter to the minor axis diameter of a regular hexagon is $RR=2/3^{1/2}=1.15$, it was confirmed from the ratio RK1 of the main air hole 14K1 and the ratio RK2 of the sub-air hole 14K2 that the main air hole 14K1 and the sub-air hole 14K2 had a regular-hexagonal prism shape.

Each of the center distances $\Delta x$ and $\Delta y$ between the center-of-gravity D1 of the main air hole 14K1 and the center-of-gravity D2 of the sub-air hole 14K2 was 65.4 nm (=0.4×PC), which was unchanged from before the embedding.

The major axis of each of the main air hole 14K1 and the sub-air hole 14K2 was parallel to <11-20> axis (i.e., a axis).

3. Element Characteristics, Evaluation (1) Comparative Example 1 and Comparative Example 2

In the evaluation of the PCSEL element 10 in Example 3, comparison with the foregoing PCSEL element in Comparative Example 1 having a single lattice structure in which single air holes were formed at respective lattice points was made. Moreover, comparison with the PCSEL element in the foregoing Comparative Example 2 that differs 90° in the major axis direction of each of the main air hole and the sub-air hole from Example 3 was made.

(2) Threshold Gain (Coupled Wave Theory)

From the electric field intensity distribution in the basic mode in the structure in each of Example 3 and Comparative Example 1, the optical confinement factor ($\Gamma$act) of the active layer, and the optical confinement factor ($\Gamma$mg) of the Mg-doped layer (p contact layer, p cladding layer, electron blocking layer) were estimated. Moreover, the resonator loss ($\alpha_p$) in an in-plane direction of the photonic crystal layer 14P and the resonator loss ($\alpha_n$) in a direction perpendicular to the photonic crystal layer 14P were estimated using the two-dimensional coupled wave theory.

In both Example 3 and Comparative Example 1, the absorption factor $\alpha_{mg}$ of the Mg-doped layer was estimated to be 160 cm$^{-1}$. From the optical confinement factor ($\Gamma$mg) and the absorption factor $\alpha_{mg}$, the absorption loss $\alpha$i was the value shown in Table 2 according to the foregoing (Formula 1). The threshold gain Gth of the laser was calculated according to the foregoing (Formula 2), and was estimated to be 1068 cm$^{-1}$ in Example 3 and 724 cm$^{-1}$ in Comparative Example 1 as illustrated in Table 2. These results are shown in Table 2.

of the PCSEL element 10 in Example 3 and the PCSEL element in Comparative Example 1 around threshold current. The measurement was performed by pulse current driving of a pulse width of 100 ns and a pulse period of 1 kHz.

The PCSEL element 10 in Example 3 performed highly unimodal laser oscillation at a threshold current of 1.21 A (threshold current density: 3.8 kA/cm$^2$). The PCSEL element in Comparative Example 1 performed highly unimodal laser oscillation at a threshold current of 0.71 A (threshold current density: 2.2 kA/cm$^2$). The reason why the threshold current in Example 3 was greater than that in Comparative Example 1 is because of the increase of the threshold gain Gth in Table 2.

In Example 3 and Comparative Example 1, the rate of increase of the threshold gain Gth and the rate of increase of the threshold current are approximately equal. Hence, it is considered that the increase of the threshold current is due to the increase of the resonator loss and the absorption loss, and the quality of the active layer is unaffected even in the case where the dual lattice structure is introduced as in Example 3.

The slope efficiency of the PCSEL element 10 in Example 3 was 0.35 W/A, which is a significant increase from 0.10 W/A in Comparative Example 1. This is because, in Example 3, u (i.e., increase in light propagating in the vertical direction) was large as described above and therefore the amount of light that can be extracted as output was large. Thus, by forming the lattice structure in the air hole layer as a dual lattice structure, large output can be obtained with lower current.

TABLE 2

Optical Loss and Threshold Gain in Example 3 and Comparative Example 1

| | $\Gamma_{act}$ | $\Gamma_{mg}$ | $\alpha_p$ ($\alpha_{//}$) | $\alpha_n$ ($\alpha_\perp$) | $\alpha_i$ | $G_{th}$ |
|---|---|---|---|---|---|---|
| Example 3 | 3.78% | 9.40% | 10.5 cm$^{-1}$ | 14.9 cm$^{-1}$ | 15.0 cm$^{-1}$ | 1068 cm$^{-1}$ |
| Comparative Example 1 | 3.69% | 8.61% | 10.8 cm$^{-1}$ | 2.36 cm$^{-1}$ | 13.8 cm$^{-1}$ | 724 cm$^{-1}$ |

In Table 2, $\alpha_n$ in Example 3 is greater than $\alpha_n$ in Comparative Example 1. This is because the 90° rotational symmetry of the lattice point structure was broken due to the dual lattice structure. In Comparative Example 1, since the lattice point structure had 90° rotational symmetry, the light diffracted in the vertical direction among the light propagating in the air hole layer was canceled by vanishing interference.

In Example 3, since the 90° rotational symmetry was lower, this vanishing interference was weaker, so that a larger amount of light was diffracted in the vertical direction. That is, $\alpha_n$ increased.

Thus, in Example 3 in which the main air hole 14K1 and the sub-air hole 14K2 have a regular-hexagonal prism shape, too, the light component propagating in the vertical direction was significantly increased as compared with the photonic crystal layer of the single lattice structure.

(3) Light Output Characteristics, Light Emission Spectrum

Figure 20A:
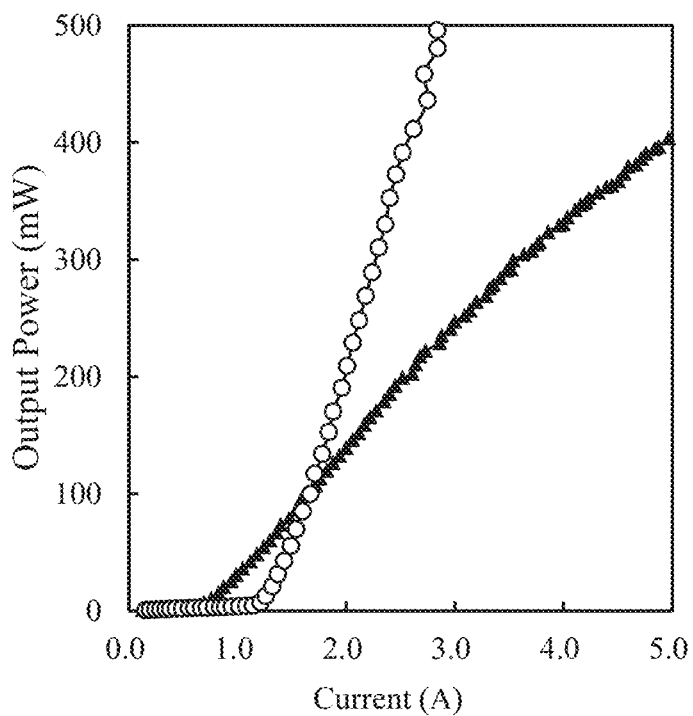
FIG. 20A is a diagram illustrating the I-L characteristics of each of the PCSEL element 10 in Example 3 and the PCSEL element in Comparative Example 1.
Figure 20B:
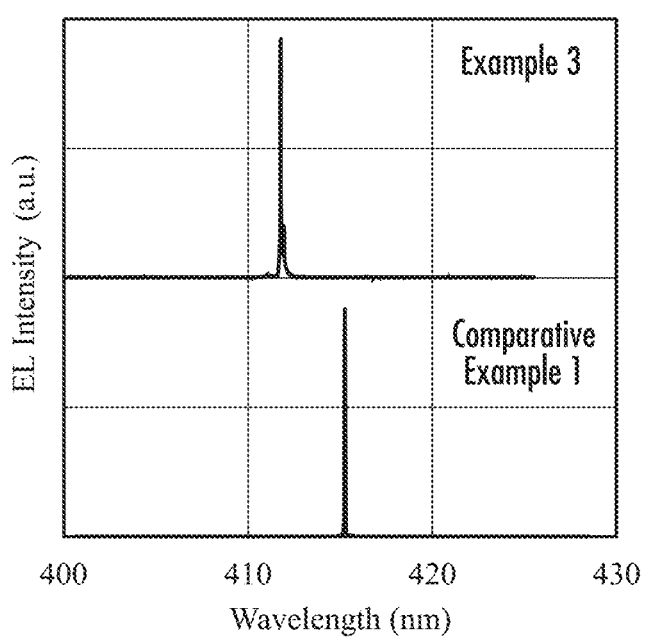
FIG. 20B is a diagram illustrating the light emission spectrum of each of the PCSEL element 10 in Example 3 and the PCSEL element in Comparative Example 1 around threshold current.

FIG. 20A illustrates the I-L characteristics (current-light output characteristics) of each of the PCSEL element 10 in Example 3 and the PCSEL element in Comparative Example 1. FIG. 20B illustrates the light emission spectrum of each (4) Positional Relationship Between Main Air Hole and Sub-Air Hole and Resonator Loss In Example 3, the PCSEL element having the air hole layer of a dual lattice structure in which each lattice point was composed of two regular-hexagonal prism shaped main air hole 14K1 and the sub-air hole 14K2 was produced.

FIG. 21A and FIG. 21B illustrate the resonator losses $\alpha_n$ and up in the vertical and horizontal directions for the photonic crystal layer 14P when, in the structure in Example 3, changing the center distances $\Delta x$ and $\Delta y$ ($\Delta x=\Delta y$) between the main air hole 14K1 and the sub-air hole 14K2 from 0.0 PC to 0.5 PC (PC is the period of the square lattice). The horizontal axis represents the ratio d of the center distance (distance between main air hole and sub-air hole) $\Delta x$ and $\Delta y$ to the square lattice period PC (i.e., d=$\Delta x$/PC=$\Delta y$/PC).

Figure 21C:
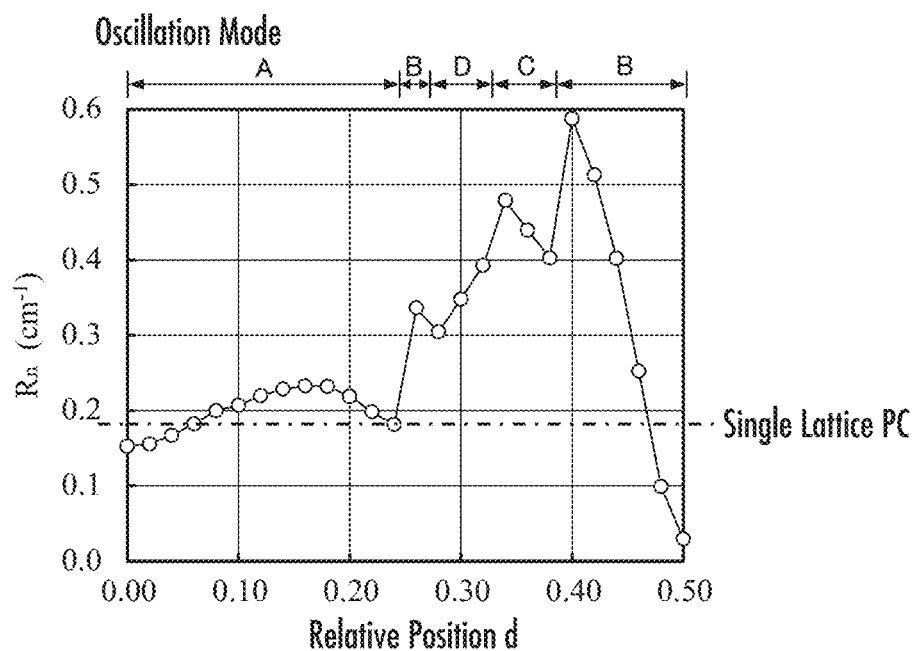
FIG. 21C is a diagram illustrating the dependence of $R_n$ on the relative position d.

FIG. 21C illustrates the center distance dependence of $R_n$ calculated from the foregoing (Formula 3). $R_n$ is the proportion of the resonator loss $\alpha_n$ in the vertical direction to the total resonator loss ($\alpha_p+\alpha_n$).

In the photonic-crystal surface-emitting laser, the slope efficiency $\eta$SE is proportional to the proportion of $\alpha_n$ (resonator loss in the vertical direction) to the total loss including absorption loss αi, as indicated in the foregoing (Formula 4).

Accordingly, if the absorption loss αi by the constituent materials can be reduced to zero, ηSE is proportional to $R_n$. Hence, it is desirable to increase $R_n$ in order to enhance the emission efficiency (i.e., ηSE) of the PCSEL element and obtain a PCSEL element capable of higher output.

$R_n$ in the conventional PCSEL element of the single lattice structure (Comparative Example 1) is about 0.18 from Table 2. To achieve higher $R_n$ in the PCSEL element of the dual lattice structure made up of regular-hexagonal prism-shaped main air holes and sub-air holes in Example 3 than in the PCSEL element of the single lattice structure ($R_n$=0.18), the center distance (relative position d) (=Δx/PC=Δy/PC) between the main air hole 14K1 and the sub-air hole 14K2 is preferably 0.06 or more and or 0.47 or less, with reference to FIG. 21C.

While it is considered that the fourfold (90°) rotational symmetry of the spatial refractive index distribution within the lattice point can be broken by using a long-hexagonal prism shape having a higher major axis diameter/minor axis diameter ratio as the air hole shape, the above reveals that high $R_n$ can be obtained even with an air hole of a regular-hexagonal prism shape having a low major axis diameter/minor axis diameter ratio of 1.15.

To stably embed air holes in a PCSEL element using GaN-based material, however, it is preferable to change the shape of the side surface of the air hole to thermally stable m plane during growth. That is, the major axis diameter/minor axis diameter ratio of each air hole forming the, air hole layer is preferably 1.15 or more.

(5) Oscillation Mode

Figure 21D:
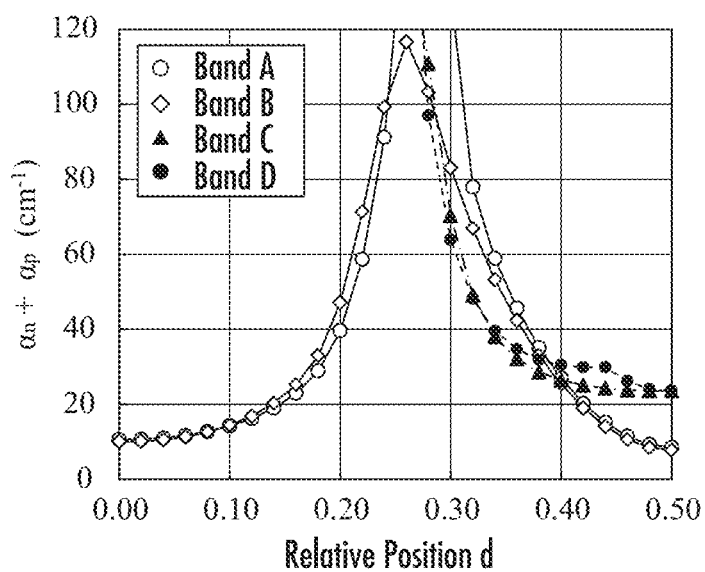
FIG. 21D is a graph illustrating the threshold gain (resonator loss) in each mode determined by the coupled wave theory when changing $\Delta x$ and $\Delta y$ (relative position d) in Example 3.

FIG. 21D illustrates the threshold gain (resonator loss) in each mode determined by the coupled wave theory when changing the relative position d (=Δx/PC=Δy/PC) of the sub-air hole 14K2 to the main air hole 14K1 in Example 3.

As illustrated in the drawing, the mode with the lowest threshold gain is mode A when the relative position d is 0.24×PC or less (d≤0.24), mode B when the relative position d is 0.24 PC to 0.28 PC (0.24<d≤0.28), mode C when the relative position d is 0.28 PC to 0.34 PC (0.28<d<0.34), mode D when the relative position d is 0.34 PC to 0.40 PC (0.34≤d<0.40), and mode B when the relative position d is 0.40 PC or more (0.40≤d).

To achieve stable oscillation when high current is injected, it is preferable to perform oscillation in modes A and B, as described above with reference to FIG. 16A and FIG. 16B.

(6) Air Hole Filling Factor (FF)

Figure 22A:
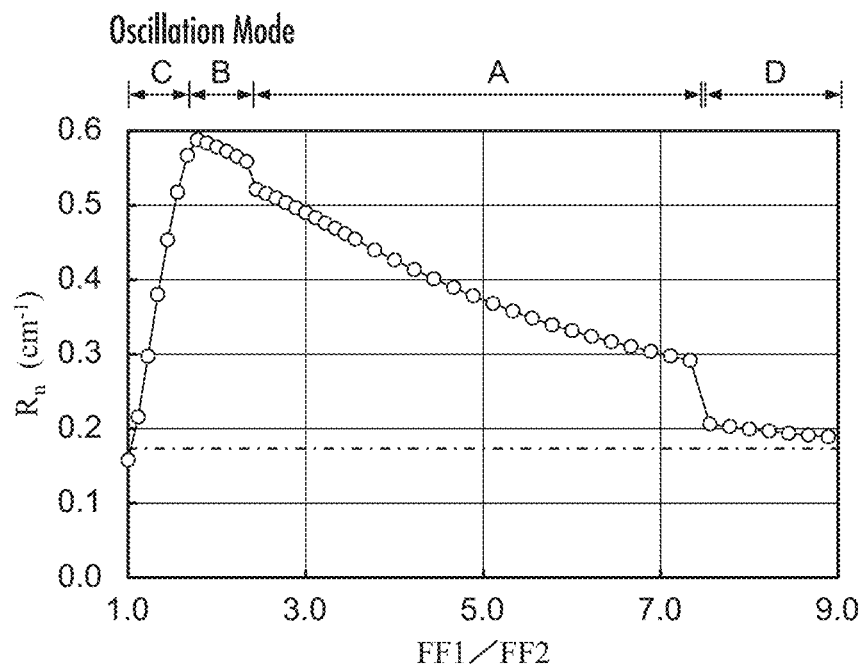
FIG. 22A is a diagram illustrating $R_n$ to the air hole filling factor ratio FF1/FF2.
Figure 22B:
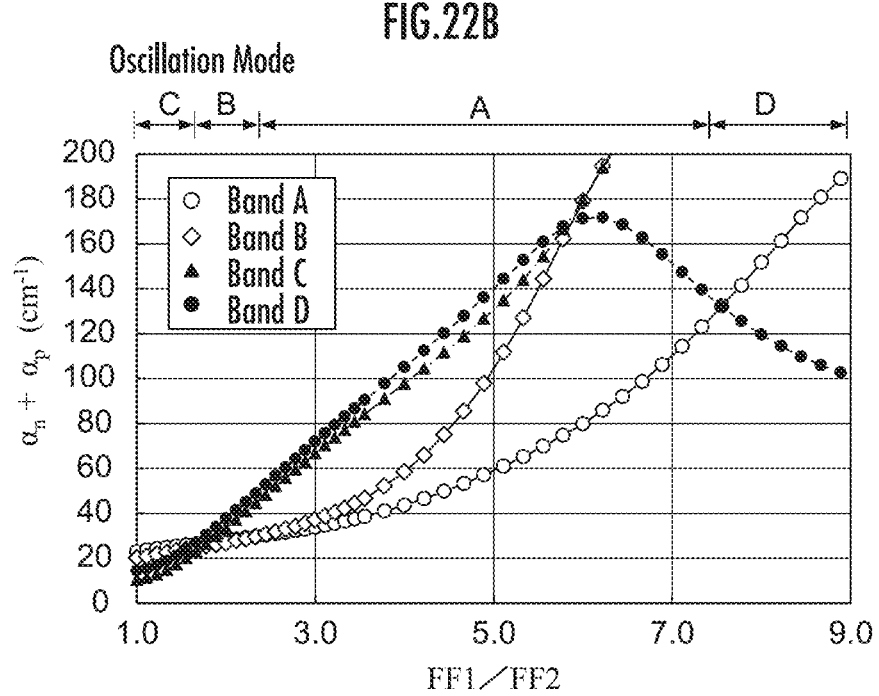
FIG. 22B is a diagram illustrating the sum ($\alpha_n+\alpha_p$) of the resonator losses in the vertical and horizontal directions to the air hole filling factor ratio FF1/FF2.

The resonator loss when changing the air hole filling factor FF1 of the main air hole 14K1 in a range of 4.5% to 40% while maintaining the air hole filling factor FF2 of the sub-air hole 14K2 at a constant value of 4.5% in the structure of Example 3 was determined by the two-dimensional the coupled wave theory. FIG. 22A and FIG. 22B illustrate $R_n$ against the air hole filling factor ratio FF1/FF2 and the sum ($α_n+α_p$) of the resonator losses in the vertical and horizontal directions, respectively.

Herein, the air hole filling factor is the proportion of the area of each air hole per unit area in two-dimensional periodical arrangement, as mentioned above. Specifically, in a square lattice (period PC), the air hole filling factor FF1 of the main air hole 14K1=S1/PC$^2$, and the air hole filling factor FF2 of the sub-air hole 14K2=S2/PC$^2$, where S1 and S2 respectively denote the areas of the main air hole 14K1 and the sub-air hole 14K2 in the air hole layer.

Typically, the photonic band structure around Γ point of the square lattice photonic crystal is as illustrated in FIG. 13, i.e. there are four band edge modes. As illustrated in FIG. 22A and FIG. 22B, the band edge mode with the lowest loss changes as the air hole filling factor ratio FF1/FF2 changes.

To achieve stable oscillation when high current is injected, it is preferable to perform oscillation in modes A and B, as described in detail in Example 1 and Example 2. To perform oscillation in modes A and B, the air hole filling factor ratio RF=FF1/FF2 is in a range of 1.7 to 7.5, as illustrated in FIG. 22A and FIG. 22B. That is, it is preferable that 1.7≤(FF1/FF2)≤7.5.

Although the foregoing examples each describe the case where the main air hole 14K1 and the sub-air hole 14K2 have a long-hexagonal prism shape or a regular-hexagonal prism shape, the sub-air hole 14K2 may have a cross section of a perfect circular cylindrical shape, a regular-hexagonal prism shape, or the like.

Although the foregoing examples each describe the case where the main air hole 14K1 after embedding has a long-hexagonal prism shape or a regular-hexagonal prism shape, the present invention is not limited to such. The main air hole 14K1 may have an elliptic cylindrical shape, or have an intermediate shape in a process in which the hole changes from a cylindrical shape or an elliptic cylindrical shape to a regular-hexagonal prism shape or a long-hexagonal prism shape by embedded growth. Herein, "regular-hexagonal prism shape, long-hexagonal prism shape, or elliptic cylindrical shape" includes an intermediate shape in a process of changing from a cylindrical shape or an elliptic cylindrical shape to a regular-hexagonal prism shape or a long-hexagonal prism shape.

In the case where the main air hole 14K1 has a regular-hexagonal prism shape, a long-hexagonal prism shape, or an elliptic cylindrical shape with a major axis parallel to <11-20> axis, the sub-air hole 14K2 may have a regular-hexagonal prism shape, a long-hexagonal prism shape, or an elliptic cylindrical shape with a major axis parallel to <11-20> axis.

Although the foregoing examples each describe a photonic crystal layer 14P in which an air hole pair made up of a main air hole 14K1 and a sub-air hole 14K2 are arranged at each square lattice point, an air hole set made up of a main air hole 14K1, a sub-air hole 14K2, and at least one air hole may be arranged at each square lattice point to form a multiple lattice photonic crystal layer.

The numerical values the foregoing examples are merely examples, and can be appropriately modified and applied.

As described in detail above, according to the foregoing embodiments, it is possible to provide a photonic-crystal surface-emitting laser (PCSEL) element that includes a two-dimensional photonic crystal (hereafter also referred to as a multiple lattice photonic crystal) in which a plurality of air holes of different sizes are arranged at lattice points and a set of the plurality of air holes is periodically arranged and has significantly improved flatness of the surface of an embedding layer for embedding the multiple lattice photonic crystal, and a manufacturing method for the same.

It is also possible to provide a photonic-crystal surface-emitting laser that has high quality and crystallinity of an active layer grown on a multiple lattice photonic crystal layer, has high light extraction efficiency, and can oscillate with low threshold current density and high quantum efficiency, and a manufacturing method for the same.

DESCRIPTION OF REFERENCE NUMERALS

10 PCSEL element
11 semiconductor structure layer
12 substrate
13 first cladding layer
14 first guide layer
14A lower guide layer
14P photonic crystal layer (PC layer)
14B embedding layer
15 active layer
16 second guide layer
17 electron blocking layer
18 second cladding layer
19 contact layer
20A first electrode
20B second electrode
20L light-emitting region
25 second embedding layer
CD1, CD2 center-of-gravity
K1/K2 main/sub-opening
14H1/14H2 main/sub-hole
14K1/14K2 main/sub-air hole

The invention claimed is:

1. A surface-emitting laser element made of a group-3 nitride semiconductor, the surface-emitting laser element comprising:
a first guide layer including a photonic crystal layer that is formed on a c plane of the group-3 nitride semiconductor and includes air holes arranged with two-dimensional periodicity in a plane parallel to the photonic crystal layer, and an embedding layer that is formed on the photonic crystal layer and closes the air holes;
an active layer formed on the first guide layer; and
a second guide layer formed on the active layer,
wherein an air hole set including at least a main air hole and a sub-air hole smaller in air hole diameter and depth than the main air hole is arranged at each square lattice point in the plane parallel to the photonic crystal layer, and
wherein the main air hole has a regular-hexagonal prism shape, a long-hexagonal prism shape, or an elliptic cylindrical shape with a major axis parallel to a <11-20> axis.

2. The surface-emitting laser element according to claim 1, wherein the sub-air hole has a regular-hexagonal prism shape, a long-hexagonal prism shape, or an elliptic cylindrical shape with a major axis parallel to the <11-20> axis.

3. The surface-emitting laser element according to claim 1, wherein the main air hole and the sub-air hole each have a regular-hexagonal prism shape with a major axis parallel to the <11-20> axis.

4. The surface-emitting laser element according to claim 1, wherein a center-of-gravity of the sub-air hole is separate from a center-of-gravity of the main air hole in a <1-100> direction.

5. The surface-emitting laser element according to claim 1, wherein the air hole set is arranged in an x direction and a y direction that are orthogonal to each other and are at an angle of 45° with respect to the <11-20> axis and a <1-100> axis, and
wherein relative positions $\Delta x$ and $\Delta y$ of the sub-air hole to the main air hole satisfy $\Delta x = \Delta y$, and satisfy $0.06 \leq d \leq 0.28$ or $0.40 \leq d \leq 0.47$ where $\Delta x = \Delta y = d \times PC$ and PC is a period of a square lattice.

6. The surface-emitting laser element according to claim 1, wherein the main air hole and the sub-air hole each have a hexagonal prism shape whose side surfaces are each an m plane.

7. The surface-emitting laser element according to claim 1, wherein an air hole filling factor ratio $RF=FF1/FF2$ satisfies $1.7 \leq RF \leq 7.5$, where FF1 and FF2 are respectively air hole filling factors of the main air hole and the sub-air hole in the photonic crystal layer.

8. The surface-emitting laser element according to claim 1, wherein the guide layer is a GaN layer, and
wherein the embedding layer includes a first embedding layer that is a GaN layer, and a second embedding layer that is formed on the first embedding layer and contains indium (In) in a composition thereof.

9. A manufacturing method for a surface-emitting laser element made of a group-3 nitride semiconductor, the manufacturing method comprising:
forming a guide layer on a c plane of the group-3 nitride semiconductor;
forming an etching mask on the guide layer, the etching mask having an opening set including at least a main opening and a sub-opening smaller in size than the main opening at each square lattice point;
forming a main hole and a sub-hole by etching the guide layer using the etching mask;
forming an embedding layer that closes openings of the main hole and the sub-hole by performing crystal growth including mass transport, to form a multiple lattice photonic crystal layer in which an air hole set including a main air hole and a sub-air hole smaller in air hole diameter and depth than the main air hole is arranged at each square lattice point; and
forming a semiconductor layer including an active layer on the multiple lattice photonic crystal layer,
wherein the main air hole has a regular-hexagonal prism shape, a long-hexagonal prism shape, or an elliptic cylindrical shape with a major axis parallel to a <11-20> axis.

10. The manufacturing method for a surface-emitting laser element according to claim 9, wherein the sub-air hole has a regular-hexagonal prism shape, a long-hexagonal prism shape, or an elliptic cylindrical shape with a major axis parallel to the <11-20> axis.

11. A surface-emitting laser element made of a group-3 nitride semiconductor, the surface-emitting laser element comprising:
a first guide layer including a photonic crystal layer that is formed on a c plane of the group-3 nitride semiconductor and includes air holes arranged with two-dimensional periodicity in a plane parallel to the photonic crystal layer, and an embedding layer that is formed on the photonic crystal layer and closes the air holes;
an active layer formed on the first guide layer; and
a second guide layer formed on the active layer,
wherein an air hole set including at least a main air hole and a sub-air hole smaller in air hole diameter and depth than the main air hole is arranged at each square lattice point in the plane parallel to the photonic crystal layer, and
wherein the main air hole and the sub-air hole each have a regular-hexagonal prism shape with a major axis parallel to a <11-20> axis.

* * * * *